(12) United States Patent
Jones et al.

(10) Patent No.: US 7,649,730 B2
(45) Date of Patent: Jan. 19, 2010

(54) WET ELECTROLYTIC CAPACITOR CONTAINING A PLURALITY OF THIN POWDER-FORMED ANODES

(75) Inventors: Brady Jones, Myrtle Beach, SC (US); Gang Ning, Myrtle Beach, CA (US); Bharat Rawal, Surfside Beach, SC (US)

(73) Assignee: AVX Corporation, Myrtle Beach, SC (US)

( * ) Notice: Subject to any disclaimer, the term of this patent is extended or adjusted under 35 U.S.C. 154(b) by 243 days.

(21) Appl. No.: 11/726,029

(22) Filed: Mar. 20, 2007

(65) Prior Publication Data

US 2008/0232030 A1    Sep. 25, 2008

(51) Int. Cl.
*H01G 9/00* (2006.01)
(52) U.S. Cl. .................. 361/523; 361/516; 361/519; 361/525; 361/528; 361/529
(58) Field of Classification Search ......... 361/523–525, 361/528–529, 508–509, 516–519, 540–541
See application file for complete search history.

(56) References Cited

U.S. PATENT DOCUMENTS

| | | | |
|---|---|---|---|
| 2,582,993 A | 1/1952 | Howatt | |
| 2,966,719 A | 1/1961 | Park, Jr. | |
| 3,082,360 A | 3/1963 | Robinson et al. | |
| 3,138,746 A | 6/1964 | Burger et al. | |
| 3,345,545 A | 10/1967 | Bourgault et al. | |
| 3,544,434 A | 12/1970 | Giller et al. | |
| 3,647,415 A | 3/1972 | Yano et al. | |
| 3,647,420 A | 3/1972 | Restelli | |
| 3,835,055 A | 9/1974 | Chesnot | |

(Continued)

FOREIGN PATENT DOCUMENTS

CN    1549286    11/2004

(Continued)

OTHER PUBLICATIONS

Abstract of Japanese Patent No. JP1158715 dated Jun. 21, 1989.

(Continued)

*Primary Examiner*—Nguyen T Ha
(74) *Attorney, Agent, or Firm*—Dority & Manning, P.A.

(57) ABSTRACT

A wet electrolytic capacitor that includes a plurality of anodes, cathode, and working electrolyte that is disposed in electrical contact with the anodes and current collector is provided. Any number of anodes may generally be employed, such as from 2 to 40, in some embodiments from 3 to 30, and in some embodiments, from 4 to 20. The anodes are thin and typically have a thickness of about 1500 micrometers or less, in some embodiments about 1000 micrometers or less, and in some embodiments, from about 50 to about 500 micrometers. By employing a plurality of anodes that are relatively thin in nature, the resulting wet electrolytic capacitor is able to achieve excellent electrical properties. For example, the equivalent series resistance ("ESR")—the extent that the capacitor acts like a resistor when charging and discharging in an electronic circuit—may be less than about 1500 milliohms, in some embodiments less than about 1000 milliohms, and in some embodiments, less than about 500 milliohms, measured with a 2-volt bias and 1-volt signal at a frequency of 1000 Hz.

20 Claims, 2 Drawing Sheets

U.S. PATENT DOCUMENTS

| | | |
|---|---|---|
| 3,953,703 A | 4/1976 | Hurwitt |
| 4,031,436 A | 6/1977 | Alwitt |
| 4,071,878 A | 1/1978 | Stynes |
| 4,085,435 A | 4/1978 | Galvagni |
| 4,109,377 A | 8/1978 | Blazick et al. |
| 4,121,949 A | 10/1978 | Walters |
| 4,149,876 A | 4/1979 | Rerat |
| 4,214,071 A | 7/1980 | Alvino et al. |
| 4,408,257 A | 10/1983 | Walters |
| 4,466,841 A | 8/1984 | Walters |
| 4,469,610 A | 9/1984 | Fukuda et al. |
| 4,470,098 A | 9/1984 | Alexander |
| 4,494,174 A | 1/1985 | Schroeder |
| 4,523,255 A | 6/1985 | Rogers |
| 4,535,389 A | 8/1985 | Buczkowski et al. |
| 4,599,383 A | 7/1986 | Satoji |
| 4,683,516 A | 7/1987 | Miller |
| 4,684,399 A | 8/1987 | Bergman et al. |
| 4,774,011 A | 9/1988 | Mori et al. |
| 4,780,797 A | 10/1988 | Libby |
| 4,786,342 A | 11/1988 | Zellner et al. |
| 4,945,452 A | 7/1990 | Sturmer et al. |
| 4,981,942 A | 1/1991 | Bockrath et al. |
| 4,985,098 A | 1/1991 | Kohno et al. |
| 4,992,910 A | 2/1991 | Evans |
| 5,002,710 A | 3/1991 | Shanefield et al. |
| 5,043,849 A | 8/1991 | Libby |
| 5,045,170 A | 9/1991 | Bullock et al. |
| 5,098,485 A | 3/1992 | Evans |
| 5,105,341 A | 4/1992 | Stephenson et al. |
| 5,160,653 A | 11/1992 | Clouse et al. |
| 5,183,340 A | 2/1993 | Higginbotham et al. |
| 5,198,968 A | 3/1993 | Galvagni |
| 5,230,956 A | 7/1993 | Cole et al. |
| 5,304,330 A | 4/1994 | Tatarchuk et al. |
| 5,306,479 A | 4/1994 | Sommers |
| 5,357,399 A | 10/1994 | Salisbury |
| 5,369,547 A | 11/1994 | Evans |
| 5,394,295 A | 2/1995 | Galvagni |
| 5,400,211 A | 3/1995 | Evans |
| 5,419,824 A | 5/1995 | Weres et al. |
| 5,419,977 A | 5/1995 | Weiss et al. |
| 5,442,978 A | 8/1995 | Hildreth et al. |
| 5,448,447 A | 9/1995 | Chang |
| 5,457,862 A | 10/1995 | Sakata et al. |
| 5,469,325 A | 11/1995 | Evans |
| 5,473,503 A | 12/1995 | Sakata et al. |
| 5,495,386 A | 2/1996 | Kulkarni |
| 5,522,558 A | 6/1996 | Kaneko |
| 5,687,057 A | 11/1997 | Dapo |
| 5,726,118 A | 3/1998 | Ivey et al. |
| 5,729,428 A | 3/1998 | Sakata et al. |
| 5,737,181 A | 4/1998 | Evans |
| 5,754,394 A | 5/1998 | Evans et al. |
| 5,777,428 A | 7/1998 | Farahmandi et al. |
| 5,786,555 A | 7/1998 | Saito et al. |
| 5,786,980 A | 7/1998 | Evans |
| 5,812,367 A | 9/1998 | Kudoh et al. |
| 5,858,911 A | 1/1999 | Wellen et al. |
| 5,894,403 A | 4/1999 | Shah et al. |
| 5,920,455 A | 7/1999 | Shah et al. |
| 5,926,362 A | 7/1999 | Muffoletto et al. |
| 5,949,639 A | 9/1999 | Maeda et al. |
| 5,963,418 A * | 10/1999 | Greenwood et al. ......... 361/508 |
| 5,973,913 A | 10/1999 | McEwan et al. |
| 5,982,609 A | 11/1999 | Evans |
| 5,986,876 A | 11/1999 | Stepanov et al. |
| 6,051,044 A | 4/2000 | Fife |
| 6,052,273 A | 4/2000 | Inoue et al. |
| 6,059,847 A | 5/2000 | Farahmandi et al. |
| 6,072,692 A | 6/2000 | Hiratsuka et al. |
| 6,094,339 A * | 7/2000 | Evans ..................... 361/516 |
| 6,094,788 A | 8/2000 | Farahmandi et al. |
| 6,104,600 A | 8/2000 | Suhara et al. |
| 6,115,235 A | 9/2000 | Naito |
| 6,126,097 A | 10/2000 | Chen et al. |
| 6,128,179 A | 10/2000 | Morokuma |
| 6,145,765 A | 11/2000 | Capelle, Jr. et al. |
| 6,165,623 A | 12/2000 | Fife et al. |
| 6,181,546 B1 | 1/2001 | Stepanov et al. |
| 6,191,936 B1 | 2/2001 | Webber et al. |
| 6,208,502 B1 | 3/2001 | Hudis et al. |
| 6,219,222 B1 | 4/2001 | Shah et al. |
| 6,224,985 B1 | 5/2001 | Shah et al. |
| 6,301,093 B1 | 10/2001 | Noguchi et al. |
| 6,309,428 B1 | 10/2001 | Niiori et al. |
| 6,310,765 B1 | 10/2001 | Tanahashi et al. |
| 6,322,912 B1 | 11/2001 | Fife |
| 6,332,900 B1 | 12/2001 | Muffoletto et al. |
| 6,334,879 B1 | 1/2002 | Muffoletto et al. |
| 6,373,685 B1 | 4/2002 | Kimmel et al. |
| 6,375,704 B1 | 4/2002 | Habecker et al. |
| 6,377,442 B1 | 4/2002 | Strange et al. |
| 6,391,275 B1 | 5/2002 | Fife |
| 6,414,837 B1 | 7/2002 | Sato et al. |
| 6,416,730 B1 | 7/2002 | Fife |
| 6,420,043 B1 | 7/2002 | Fife et al. |
| 6,442,015 B1 | 8/2002 | Niiori et al. |
| 6,452,784 B2 | 9/2002 | Nakada et al. |
| 6,455,108 B1 | 9/2002 | Muffoletto et al. |
| 6,462,934 B2 | 10/2002 | Kimmel et al. |
| 6,468,605 B2 | 10/2002 | Shah et al. |
| 6,479,581 B1 | 11/2002 | Ireland et al. |
| 6,507,480 B2 | 1/2003 | Nomoto et al. |
| 6,510,042 B1 | 1/2003 | Lee et al. |
| 6,517,645 B2 | 2/2003 | Fife |
| 6,522,523 B2 | 2/2003 | Takatomi et al. |
| 6,562,255 B1 | 5/2003 | Feger |
| 6,563,695 B1 | 5/2003 | Suzuki |
| 6,576,524 B1 | 6/2003 | Evans et al. |
| 6,592,740 B2 | 7/2003 | Fife |
| 6,594,139 B2 | 7/2003 | Muffoletto et al. |
| 6,594,140 B1 | 7/2003 | Evans et al. |
| 6,614,646 B2 | 9/2003 | Bogaki et al. |
| 6,660,583 B2 | 12/2003 | Fujino et al. |
| 6,674,635 B1 | 1/2004 | Fife et al. |
| 6,687,116 B2 | 2/2004 | Hudis |
| 6,687,117 B2 * | 2/2004 | Liu et al. ................... 361/504 |
| 6,699,431 B2 | 3/2004 | Clasen et al. |
| 6,707,660 B1 | 3/2004 | Evans et al. |
| 6,721,169 B2 | 4/2004 | Melody et al. |
| 6,721,170 B1 | 4/2004 | Evans et al. |
| 6,743,370 B1 | 6/2004 | Feger et al. |
| 6,759,026 B2 * | 7/2004 | Kimmel et al. .......... 423/592.1 |
| 6,761,728 B2 | 7/2004 | Harguth et al. |
| 6,776,861 B2 | 8/2004 | Wang et al. |
| 6,788,523 B1 | 9/2004 | Hossick-Schott et al. |
| 6,801,424 B1 | 10/2004 | Nielsen et al. |
| 6,802,951 B2 | 10/2004 | Hossick-Schott |
| 6,807,048 B1 | 10/2004 | Nielsen et al. |
| 6,819,544 B1 | 11/2004 | Nielsen et al. |
| 6,827,879 B2 | 12/2004 | Shinozaki et al. |
| 6,842,328 B2 | 1/2005 | Schott et al. |
| 6,850,405 B1 | 2/2005 | Mileham et al. |
| 6,859,353 B2 | 2/2005 | Elliott et al. |
| 6,859,354 B2 | 2/2005 | Viste et al. |
| 6,885,545 B2 | 4/2005 | Michel et al. |
| 6,888,545 B2 * | 5/2005 | Napoli ..................... 345/424 |
| 6,888,717 B2 | 5/2005 | Kinard et al. |
| 6,914,768 B2 | 7/2005 | Matsumoto et al. |
| 6,939,774 B2 | 9/2005 | Viste et al. |
| 6,942,819 B2 | 9/2005 | Ebel et al. |
| 6,965,510 B1 | 11/2005 | Liu et al. |
| 6,967,829 B2 | 11/2005 | Sietz et al. |

| | | | |
|---|---|---|---|
| 7,002,790 | B2 | 2/2006 | Hossick-Schott et al. |
| 7,012,799 | B2 | 3/2006 | Muffoletto et al. |
| 7,038,901 | B2 | 5/2006 | Muffoletto et al. |
| 7,072,171 | B1 | 7/2006 | Muffoletto et al. |
| 7,079,377 | B2 | 7/2006 | Schott et al. |
| 7,081,141 | B2 | 7/2006 | Hossick-Schott et al. |
| 7,085,126 | B2 | 8/2006 | Muffoletto et al. |
| 7,092,242 | B1 | 8/2006 | Gloss et al. |
| 7,099,143 | B1 | 8/2006 | Fife et al. |
| 7,116,547 | B2 | 10/2006 | Seitz et al. |
| 7,116,548 | B2 | 10/2006 | Satterfield, Jr. et al. |
| 7,131,988 | B2 | 11/2006 | Harguth et al. |
| 7,160,615 | B2 | 1/2007 | Iwaida et al. |
| 7,169,284 | B1 | 1/2007 | Jiang et al. |
| 7,171,267 | B2 | 1/2007 | Harguth et al. |
| 7,203,055 | B2 | 4/2007 | Shin et al. |
| 7,279,117 | B2 | 10/2007 | Komatsu et al. |
| 7,377,948 | B2 | 5/2008 | Faris |
| 2002/0179753 | A1 | 12/2002 | Habecker et al. |
| 2003/0172774 | A1 | 9/2003 | Naito et al. |
| 2004/0134874 | A1 | 7/2004 | Hossick-Schott et al. |
| 2004/0219094 | A1 | 11/2004 | Motchenbacher et al. |
| 2004/0225327 | A1 | 11/2004 | Norton et al. |
| 2004/0240149 | A1 | 12/2004 | Lessner et al. |
| 2004/0240152 | A1 | 12/2004 | Hossick-Schott et al. |
| 2004/0243183 | A1 | 12/2004 | Norton et al. |
| 2004/0248746 | A1 | 12/2004 | Matsui |
| 2005/0002147 | A1 | 1/2005 | Nielsen et al. |
| 2005/0034299 | A1 | 2/2005 | Kurihara et al. |
| 2005/0089711 | A1 | 4/2005 | Hossick-Schott |
| 2005/0090108 | A1 | 4/2005 | Hossick-Schott et al. |
| 2005/0098242 | A1 | 5/2005 | Hossick-Schott et al. |
| 2005/0146841 | A1 | 7/2005 | Schott et al. |
| 2005/0150576 | A1 | 7/2005 | Venigalla |
| 2005/0177193 | A1 | 8/2005 | Nielsen et al. |
| 2005/0190530 | A1 | 9/2005 | Muffoletto et al. |
| 2006/0028787 | A1 | 2/2006 | Yoshida et al. |
| 2006/0091020 | A1 | 5/2006 | Hossick-Schott et al. |
| 2006/0139850 | A1 | 6/2006 | Rorvick et al. |
| 2006/0156920 | A1 | 7/2006 | Ekiner et al. |
| 2006/0187616 | A1 | 8/2006 | Norton et al. |
| 2006/0198081 | A1 | 9/2006 | Seitz et al. |
| 2006/0198082 | A1 | 9/2006 | Eberhard et al. |
| 2006/0227496 | A1 | 10/2006 | Hossick-Schott et al. |

FOREIGN PATENT DOCUMENTS

| | | | |
|---|---|---|---|
| EP | 1244168 | A1 | 9/2002 |
| EP | 1713102 | | 10/2006 |
| GB | 1071217 | | 6/1967 |
| GB | 11223015 | | 8/1968 |
| JP | 01-176226 | | 7/1989 |
| JP | 02-038501 | | 2/1990 |
| JP | 03-023222 | | 1/1991 |
| JP | 04-070594 | | 3/1992 |
| JP | 2005222851 | | 8/2005 |
| JP | 2005223155 | | 8/2005 |
| WO | WO 9952954 | A1 | 10/1999 |
| WO | WO 0126852 | A1 | 4/2001 |
| WO | WO 0157928 | A1 | 8/2001 |
| WO | WO 2004049361 | A1 | 6/2004 |
| WO | WO 2006127663 | A3 | 11/2006 |

OTHER PUBLICATIONS

Abstract of Japanese Patent No. JP2023604 dated Jan. 25, 1990.
Evans, et al., "Improved Capacitor Using Amorphous $RuO_2$", Evans Capacitor Company, 9$^{th}$ Int'l Seminar on Double Layer Capacitors and Similar Energy Storage Devices, Deerfield Beach, FL, 1999.
Bauer, The Oxides of Niobium, Zeitschrift fuer anorganische und allgemeine Chemie, vol. 248, No. 1, 1941.
Magneli, et al., "Note on the Crystal Structure of Niobium Dioxide", Acta Chem. Scand. 9, p. 1402, 1955.
Lapitskii, et al., Journal of Inorganic Chemistry, USSR, "The Formulation of Lower Oxides of Niobium and Tantalum in Some Reactions of Reduction and Oxidation", vol. II, No. 1, pp. 122-141, 1957.
Schwartz, et al., "Niobium Solid Electrolytic Capacitors," J. Electrochemical Society, 108(8):750-757, 1961.
Z. anorg. Allg. Chemie, vol. 317, pp. 321-333, 1962.
Mifune, et al., "Niobium Solid Electrolytic Capacitors," National Technical Report 9, 147, 1963.
Bowman, et al., "The Crystal Structure of Niobium Monoxide" Los Alams Scientific Laboratory, University of California, 1966.
Baba, et al., J. Mining and Metallurgical Inst. Of Japan, vol. 82, No. 942, p. 855, 1966.
Feschotte, et al., "Niobium: Physico-Chemical Properties of its Compounds and Alloys" Atomic Energy Review, Special Issue No. 2, International Atomic Energy Agency pp. 57-59, Vienna, 1968.
Jackson, et al., "The Use of Niobium as a Anode Material in Liquid Filled Electrolytic Capacitors," Electrocomponent Science and Technology, vol. 1, pp. 27-37, 1974.
Vest et al., "Electrical Conductivity in Ceramics and Glass", Department of the Air Force, Aerospace Research Laboratories Wright-Patterson Air Force Base, Ohio, pp. 375-384, 1974.
Gannon, et al., "The Microstructure of Slightly Substoichiometric $NbO_2$", J. Solid State Chemistry, 20, pp. 331-345, 1976.
J. Electrochemical Society: Review and News, 24(12):408C-409C, 1977.
Palatnik, et al., "Heat Field Stability and Crystallization Peculiarities of Amorphous $Nb_2O_5$, Films" Fizika I Khimiya Obrabotki Materialov, No. 5, pp. 87-94, 1980.
Bord, et al., "Quality of Niobium Oxide Semiconductor Capacitors as a Function of Chemical Composition of the Niobium Powder," No. 1(46):11-15, 1982.
Ivanovskiy, et al., "Method for the Production of Bulk Porous Anodes for Electrolytic Capacitors", 1983.
Krehl, et al., "The Influence of Gas Atmospheres on the First Stage Sintering of High-Purity Niobium Powders," Metallurgical Transactions A, vol. 15A, 1111-1116, 1984.
Orlov, et al., "Study of Oxygen Solubility in Niobium," Izvestiya Akademii Nauk SSSR, Metally,No. 5, pp. 202-205, 1985.
Petrucci, et al., "Growth of Thin-Film Niobium and Niobium Oxide Layers by Molecular Beam Epitaxy", J. Appl. Phys. 63 (3), pp. 900-909, 1987.
Sumin, "Study of NbO by Neutron Diffraction of Inelastic Scattering of Neutrons", Sov. Phys. Crystallogr., 34(3), 1989.
Levinskiy, et al., "Change in Porous Structure and Leakage Currents of Niobium Capacitor Anodes During Electrolytic Oxidation," Poroshkovaya Metallurgiya, 3:56-59, 1991.
Kuz'michevea, et al., "Superconductivity in the System Ln-Sr-Nb-O", vol. 38(1), pp. 162-166, 1992.
Eckert, "Niobium Compounds and Alloys," Int. J. Refractory Metals and Hard Materials, 12:335-340, 1993-94.
Yelyutin, et al., "Material For Anodes of Electrolytic and Oxide Semiconductor Capacitors", 1994.
"Material Safety Data Sheet for NbO", ESPI Metals (1994).
Acrivos, et al., "Dynamic Phenomena in Superconducting Oxides Measured by ESR" Phys. Rev. B, vol. 50(18), pp. 13710-13723, 1994.
Acrivos, et al., "Dynamics of Flux Motion Observed by ESR in Superconducting Oxides" Physica C (Amsterdam) 235-240, pp. 3159-3160, 1994.
Al-Kharafi, et al., "Phosphoric Acid Passivated Niobium and Tantalum EIS-Comparative Study," Electrochimica Acta, vol. 40, No. 16, pp. 2623-2626, 1994-95.
Erarslanoglu, et al., "Oxidative Coupling of Methane Over NbO (p-type) and $Nb_2O_5$ (n-type) Semiconductor Materials", Catalysis Letters, 38, pp. 215-218, 1995-96.
Alfa Aesar Product Catalog Encyclopedia of Chemical Technology, vol. 17, 4th Edition, pp. 59 and 65-66, 1995-1996.
Peabody, "Investigation of Columbium as an Electrolytic Capacitor Anode, Part II," U.S. Army Signal Research and Development Laboratory, DA Task NR. 3A99-15-003-04, pp. 1-11, Accession No. AD0603189, Monmouth, NJ, 1962.
Mellor, "Inorganic and Theoretical Chemistry" vol. IX, pp. 856-857, 1923.

Young article, "General Characteristics of the Film-Forming Metals: The Relation Between Overpotential and the Fields in the Oxide and Across the Interfaces", pp. 4-5 of Chapter 2.

Fife et al., U.S. Appl. No. 11/372,486, filed Mar. 9, 2006, Wet Electrolytic Capacitor Containing a Cathode Coating.

Fife et al., U.S. Appl. No. 11/372,461, filed Mar. 9, 2006, Wet Electrolytic Capacitor.

Gang Ning, U.S. Appl. No. 11/725,965, filed Mar. 20, 2007, Neutral Electrolyte for a Wet Electrolytic Capacitor.

Gang Ning, U.S. Appl. No. 11/725,966, filed Mar. 20, 2007, Cathode Coating for a Wet Electrolytic Capacitor.

Jones et al., U.S. Appl. No. 11/725,983, filed Mar. 20, 2007, Anode for use in Electrolytic Capacitors.

Information Disclosure Statement.

Paper—*A 170 Volt Tantalum Hybrid™ Capacitor—Engineering Consideration*, David A. Evans, Evans Capacitor Company, Presented to the Seventh International Seminar on Double Layer Capacitors and Similar Energy Storage Devices.

Product Information for Tantalum Multiple Anode from Anglia, United Kingdom.

UK Search Report for GB0802511.6 dated May 23, 2008.

* cited by examiner

WET ELECTROLYTIC CAPACITOR CONTAINING A PLURALITY OF THIN POWDER-FORMED ANODES

BACKGROUND OF THE INVENTION

Electrolytic capacitors are increasingly being used in the design of circuits due to their volumetric efficiency, reliability, and process compatibility. Typically, electrolytic capacitors have a larger capacitance per unit volume than certain other types of capacitors, making electrolytic capacitors valuable in relatively high-current and low-frequency electrical circuits. One type of capacitor that has been developed is a wet electrolytic capacitor that includes an anode, a cathode, and a liquid or "wet" working electrolyte. Wet electrolytic capacitors tend to offer a good combination of high capacitance with low leakage current. In certain situations, wet electrolytic capacitors may exhibit advantages over solid electrolytic capacitors. For example, wet electrolytic capacitors may, in certain situations, operate at a higher working voltage than solid electrolytic capacitors. Additionally, by way of example, wet electrolytic capacitors may be much larger in size than solid electrolytic capacitors, leading to larger capacitances for such large wet electrolytic capacitors.

In conventional wet electrolytic capacitors, the anode may be a metal foil (e.g., aluminum foil). Because the electrostatic capacitance of the capacitor is proportional to its electrode area, the surface of the metallic foil may be, prior to the formation of the dielectric film, roughened or subjected to a chemical conversion to increase its effective area. This step of roughening the surface of the metallic foil is called etching. Etching is normally carried out either by the method (chemical etching) of conducting immersion into a solution of hydrochloric acid or by the method (electrochemical etching) of carrying out electrolysis in an aqueous solution of hydrochloric acid. The capacitance of the electrolytic capacitor is determined by the extent of roughing (the surface area) of the anode foil and the thickness and the dielectric constant of the oxide film.

Due to the limited surface area that may be provided by etching metallic foils, attempts have also been made to employ porous sintered bodies, also called "slugs", in wet electrolytic capacitors. A tantalum slug, for instance, may be formed by mixing powdered tantalum particles with a suitable binder/lubricant to ensure that the particles will adhere to each other when pressed to form the anode. The powdered tantalum is compressed under high pressure around a tantalum wire and is sintered at high temperature under vacuum to form a sponge-like structure, which is very strong and dense but also highly porous. The porosity of the resulting tantalum slug provides a large internal surface area. Despite its high surface area, however, anode slugs may present high ESR and sensitivity of the capacitance to frequency. Further, the slugs are typically larger in size than the anode foils, thus making it difficult to incorporate them into application in which high volumetric efficiency is needed. As such, a need currently exists for an improved wet electrolytic capacitor.

SUMMARY OF THE INVENTION

In accordance with one embodiment of the present invention, a wet electrolytic capacitor is disclosed that comprises a plurality of anodes, a cathode, and a working electrolyte disposed in electrical contact with the cathode and anodes. The anodes have a thickness of about 1500 micrometers or less and are formed form from a powder. The capacitor also comprises an anode termination that is electrically connected to the anodes and a cathode termination that is electrically connected to the cathode.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
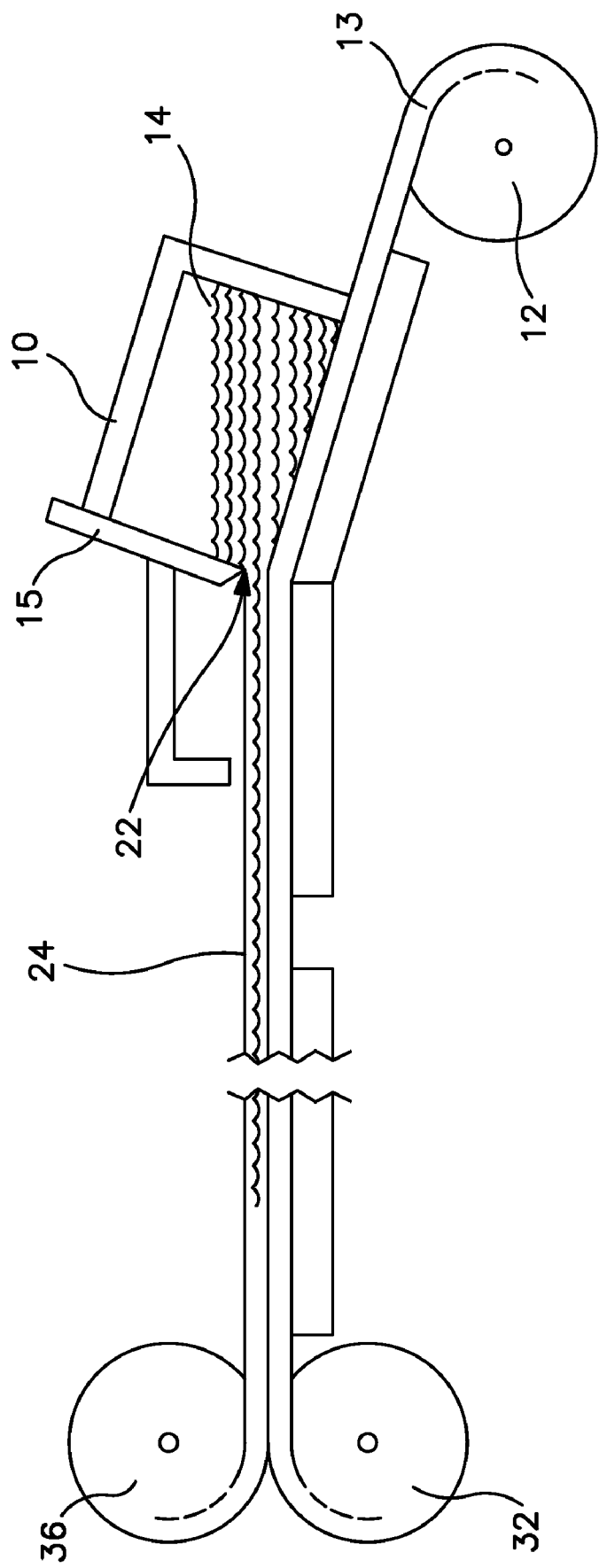
FIG. 1 is a schematic illustration of one embodiment of a method for forming an anode in accordance with the present invention

Repeat use of reference characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

The present invention is directed to a wet electrolytic capacitor that includes a plurality of anodes disposed in electrical contact with a cathode and working electrolyte. Any number of anodes may generally be employed, such as from 2 to 40, in some embodiments from 3 to 30, and in some embodiments, from 4 to 20. The anodes are thin and typically have a thickness of about 1500 micrometers or less, in some embodiments about 1000 micrometers or less, and in some embodiments, from about 50 to about 500 micrometers. By employing a plurality of anodes that are relatively thin in nature, the resulting wet electrolytic capacitor is able to achieve excellent electrical properties. For example, the equivalent series resistance ("ESR")—the extent that the capacitor acts like a resistor when charging and discharging in an electronic circuit—may be less than about 1500 milliohms, in some embodiments less than about 1000 milliohms, and in some embodiments, less than about 500 milliohms, measured with a 2-volt bias and 1-volt signal at a frequency of 1000 Hz.

Figure 2:
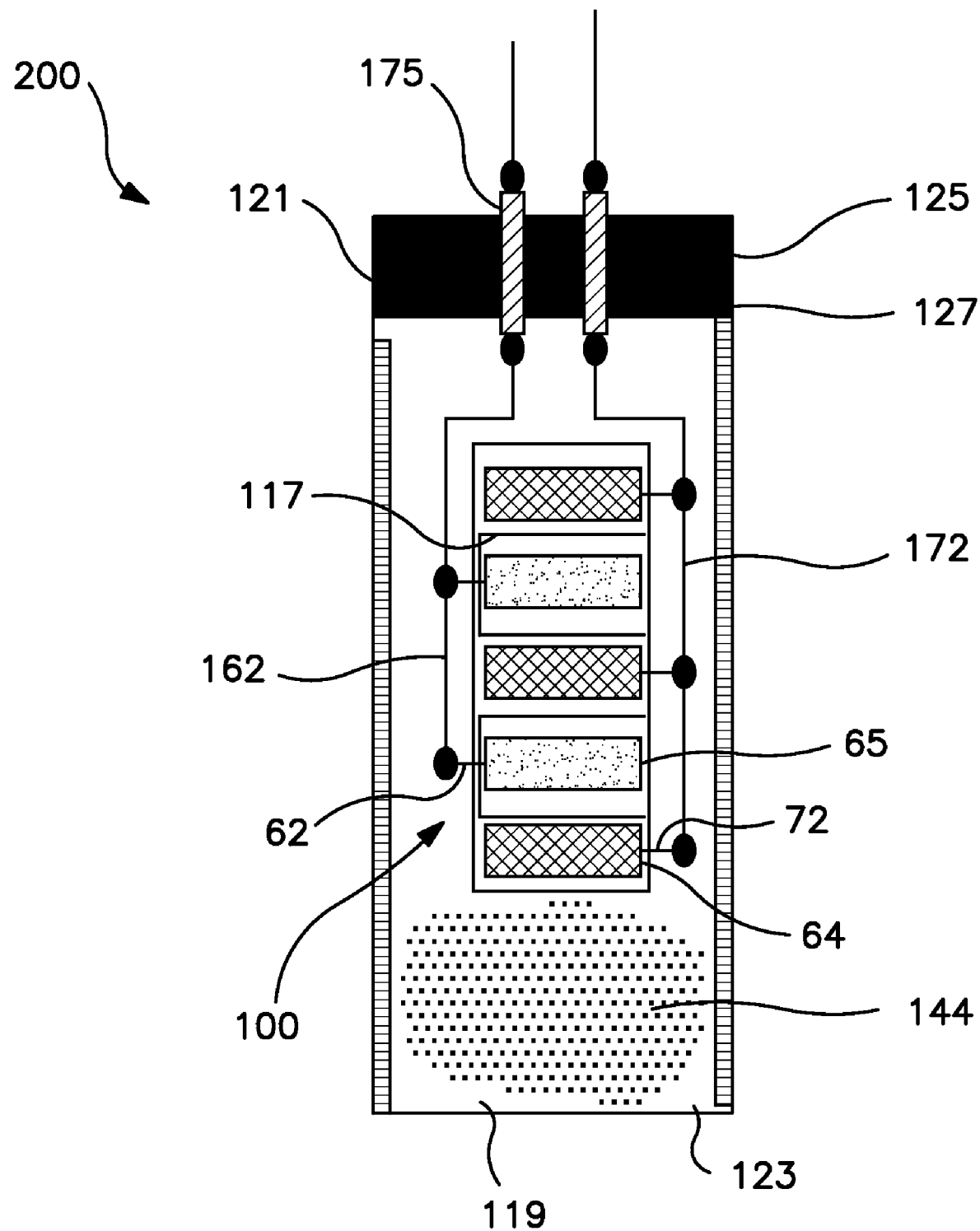
FIG. 2 is a cross-sectional view of one embodiment of a capacitor according to the present invention.

The physical arrangement of the anodes may generally vary as is well known in the art. Referring to FIG. 2, for instance, a capacitor 200 is shown that includes an array 100 of two (2) individual anodes 65 is shown. Each of the anodes 65 are positioned between individual cathodes 64 so that a total of three cathodes 64 are employed. Of course, any number of cathodes may generally be employed, such as from 1 to 50, in some embodiments from 3 to 40, and in some embodiments, from 4 to 30. In this particular embodiment, the array 100 includes one (1) rows and one (1) column of anodes and cathodes aligned so that their top/bottom surfaces are positioned adjacent to each other ("vertically aligned") to minimize the height of the assembly. For example, a top surface of a cathode defined by its width (−x direction) and length (−y direction) is placed adjacent to a corresponding bottom surface of an anode. Alternatively, the anodes and cathodes may be placed "end-to-end" so that the rear surface of one capacitor is positioned adjacent to either the front or rear surface of another capacitor ("horizontally aligned"). It should be understood that the anodes and cathodes need not extend in the same direction. For example, the surface of one cathode may be provided in a plane that is substantially perpendicular to the −x direction, while the surface of another cathode may be provided in a plane that is substantially perpendicular to the −y direction. Desirably, however, the anodes/cathodes extend in substantially the same direction.

To form an integrated capacitor assembly, the individual anodes and cathodes are electrically connected to respective cathode and anode terminations. The terminations serve as electrical connections for the capacitor assembly and also help to stabilize the individual anodes and cathodes against movement. Any conductive material may be employed to form the terminations, such as a conductive material (e.g., tantalum, niobium, copper, nickel, silver, nickel, zinc, tin, palladium, lead, copper, aluminum, molybdenum, titanium, iron, zirconium, magnesium, and alloys thereof). Particularly suitable conductive metals include, for instance, nickel, niobium, and tantalum. The terminations may generally be arranged in any desired manner so that they are electrically isolated from each other and able to receive the individual capacitors. In FIG. 2, for instance, the capacitor 200 includes individual cathodes 64 that contain cathode leads 72 that are commonly connected to a cathode termination 172 (e.g., tantalum wire). Similarly, individual anodes 65 contain anode leads 62 that are commonly connected to an anode termination 162 (e.g., tantalum wire). The cathode leads 72 and anode leads 62 may be electrically connected to the terminations 172 and 162, respectively, using any known technique. For example, the leads may be connected to the terminations either directly (e.g., laser welded, conductive adhesive, etc.) or via an additional conductive element (e.g., metal).

Separators 117 may also be positioned between the cathodes and anodes to prevent direct contact therebetween, yet permit ionic current flow of a working electrolyte 144 to the electrodes. Any material employed as a separator in known electrolytic-type may be used as a separator in the present invention. Examples include paper, plastic fibers, glass fibers, papers made of these fibers, porous membranes, and ion-permeable materials (e.g., Nafion™). Typically, an anode and corresponding cathode are separated by a distance of from about 10 micrometers to about 1000 micrometers.

If desired, the components of the capacitor 200 may be encased within a container 119. Although any shape may be employed, the container 119 is in the shape of a cylinder having a top 121 and a bottom 123. The top 121 of the container 119 is covered by a lid 125 and a sealing member 127 (e.g., rubber cork). The container 119 and/or top 125 may be made from any of a variety of conductive materials, such as copper, nickel, silver, nickel, zinc, tin, palladium, lead, copper, aluminum, molybdenum, titanium, iron, zirconium, magnesium, and alloys thereof. The terminations 162 and 172 extend through the lid 125 to provide for subsequent electrical connection. To ensure electrical isolation between the terminations 162 and 172, conductive rods 175 (e.g., stainless steel, niobium, etc.) are provided that encapsulate the terminations within the areas adjacent to the lid 125.

The particular manner in which the plurality of anodes, cathode, and working electrolyte are formed may vary. In this regard, various embodiments of such components that may be formed according to the present invention will now be described in more detail. It should be understood that the description below is merely exemplary, and multiple other embodiments are also contemplated by the present invention.

I. Anode

The anodes are generally formed from a powder composition constituted primarily by a valve metal (i.e., metal that is capable of oxidation) or from a compound that contains the valve metal as a component. Suitable valve metals that may be used include, but are not limited to, tantalum, niobium, aluminum, hafnium, titanium, alloys of these metals, and so forth. For example, the anode may be formed from a valve metal oxide or nitride (e.g., niobium oxide, tantalum oxide, tantalum nitride, niobium nitride, etc.) that is generally considered a semi-conductive or highly conductive material. Particularly suitable valve metal oxides for use in the anode include niobium oxides having an atomic ratio of niobium to oxygen of 1:less than 2.5, in some embodiments 1:less than 1.5, in some embodiments 1:less than 1.1, and in some embodiments, 1:1.0±0.2. For example, the niobium oxide may be $NbO_{0.7}$, $NbO_{1.0}$, $NbO_{1.1}$, and $NbO_2$. Additional examples of such valve metal oxides are described in U.S. Pat. No. 6,322,912 to Fife, which is incorporated herein in its entirety by reference thereto for all purposes. Examples of valve metal nitrides are also described in "Tantalum Nitride: A New Substrate for Solid Electrolytic Capacitors" by T. Tripp; Proceedings of CARTS 2000: 20th Capacitor and Resistor Technology Symposium, 6-20 Mar. 2000.

The powder composition contains particles having characteristics that enhance the performance of the capacitor anode. For example, the particles may have a specific surface area of from about 0.5 to about 10.0 $m^2/g$, in some embodiments from about 0.7 to about 5.0 $m^2/g$, and in some embodiments, from about 2.0 to about 4.0 $m^2$ g. Likewise, the resultant bulk density is typically from about 0.1 to about 20 grams per cubic centimeter ($g/cm^3$), in some embodiments from about 0.5 to about 12 $g/cm^3$, and in some embodiments, from about 1 to about 8 $g/cm^3$. The particles also typically have a screen size distribution of at least about 60 mesh, in some embodiments from about 60 to about 325 mesh, and in some embodiments, from about 100 to about 200 mesh. The particles may also have a purity level greater than about 90 wt. %, in some embodiments greater than about 95 wt. %, and in some embodiments, greater than about 98 wt. %.

If desired, mechanical milling techniques may be employed to grind the particles to the desired size. For example, a powder (e.g., NbO or $Nb_2O_5$) may be dispersed in a fluid medium (e.g., ethanol, methanol, fluorinated fluid, etc.) to form a slurry. The slurry may then be combined with a grinding media (e.g., metal balls, such as tantalum) in a mill. The number of grinding media may generally vary depending on the size of the mill, such as from about 100 to about 2000, and in some embodiments from about 600 to about 1000. The starting powder, the fluid medium, and grinding media may be combined in any proportion. For example, the ratio of the starting ceramic powder to the grinding media may be from about 1:5 to about 1:50. Likewise, the ratio of the volume of the fluid medium to the combined volume of the starting powder may be from about 0.5:1 to about 3:1, in some embodiments from about 0.5:1 to about 2:1, and in some embodiments, from about 0.5:1 to about 1:1. Some examples of mills that may be used are described in U.S. Pat. Nos. 5,522,558; 5,232,169; 6,126,097; and 6,145,765, which are incorporated herein in their entirety by reference thereto for all purposes.

Milling may occur for any predetermined amount of time needed to achieve the target specific surface area. For example, the milling time may range from about 30 minutes to about 40 hours, in some embodiments, from about 1 hour to about 20 hours, and in some embodiments, from about 5 hours to about 15 hours. Milling may be conducted at any desired temperature, including at room temperature or an elevated temperature. After milling, the fluid medium may be separated or removed from the powder, such as by air-drying, heating, filtering, evaporating, etc. For instance, the powder may optionally be subjected to one or more acid leaching steps to remove impurities. Such acid leaching steps are well known in the art and may employ any of a variety of acids, such as mineral acids (e.g., hydrochloric acid, hydrobromic acid, hydrofluoric acid, phosphoric acid, sulfuric acid, nitric acid, etc.), organic acids (e.g., citric acid, tartaric acid, formic acid, oxalic acid, benzoic acid, malonic acid, succinic acid, adipic acid, phthalic acid, etc.); and so forth. Although not required, the particles may also be agglomerated using any technique known in the art. Typical agglomeration techniques involve, for instance, one or multiple heat treatment steps in a vacuum or inert atmosphere at temperatures ranging from about 800° C. to about 1400° C. for a total time period of from about 30 to about 60 minutes.

To form the powder composition, the particles are generally dispersed in a solvent. Among other things, the solvent functions to solubilize the components of the powder composition that are volatile under ceramic firing conditions. The solvent is also useful in controlling the viscosity of the powder composition, thereby facilitating the formation of thin films. Any solvent of a variety of solvents may be employed, such as water; glycols (e.g., propylene glycol, butylene glycol, triethylene glycol, hexylene glycol, polyethylene glycols, ethoxydiglycol, and dipropyleneglycol); glycol ethers (e.g., methyl glycol ether, ethyl glycol ether, and isopropyl glycol ether); ethers (e.g., diethyl ether and tetrahydrofuran); alcohols (e.g., methanol, ethanol, n-propanol, iso-propanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. Desirably, aqueous solvents (e.g., water) may be employed. In fact, water may constitute about 20 wt. % or more, in some embodiments, about 50 wt. % or more, and in some embodiments, about 75 wt. % to 100 wt. % of the solvent(s) used in the powder composition.

The total concentration of solvent(s) employed in the powder composition may vary, but is typically from about 1 wt. % to about 50 wt. %, in some embodiments from about 5 wt. % to about 40 wt. %, and in some embodiments, from about 10 wt. % to about 30 wt. % of the powder composition. Of course, the specific amount of solvent(s) employed depends in part on the desired solids content and/or viscosity of the powder composition. For example, the solids content may range from about 20% to about 90% by weight, more particularly, between about 30% to about 80% by weight, and even more particularly, between about 40% to about 75% by weight. By varying the solids content of the powder composition, the presence of the ceramic particles in the powder composition may be controlled. For example, to form a powder composition with a higher level of particles, the formulation may be provided with a relatively high solids content so that a greater percentage of the particles are incorporated into the anode. In addition, the viscosity of the powder composition may also vary depending on the application method and/or type of solvent employed. The viscosity is typically, however, from about 5 to about 200 Pascal-seconds, in some embodiments from about 10 to about 150 Pascal-seconds, and in some embodiments, from about 20 to about 100 Pascal-seconds, as measured with a Brookfield DV-1 viscometer using Spindle No. 18 operating at 12 rpm and 25° C. If desired, thickeners or other viscosity modifiers may be employed in the powder composition to increase or decrease viscosity.

The powder composition optionally contains a binder and/or lubricant. Although any binder may be employed, organic binders are particularly suitable. Examples of such binders may include, for instance, poly(vinyl butyral); poly(vinyl acetate); poly(vinyl alcohol); poly(vinyl pyrollidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g. Carbowax from Dow Chemical Co.); silicon polymers, such as poly(methyl siloxane), poly (methylphenyl siloxane); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; and acrylic polymers, such as sodium polyacrylate, poly(lower alkyl acrylates), poly(lower alkyl methacrylates) and copolymers of lower alkyl acrylates and methacrylates.

Particularly suitable binders for use in the powder composition are latex polymer binders having a glass transition temperature of about 50° C. or less so that the flexibility of the resulting powder composition is not substantially restricted. Moreover, the latex polymer also typically has a glass transition temperature of about −35° C. or more to minimize its tackiness. Some suitable polymer lattices that may be utilized may be based on polymers such as, but are not limited to, styrene-butadiene polymers, polyvinyl acetate homopolymers, vinyl-acetate ethylene copolymers, vinyl-acetate acrylic or methacrylic polymers, ethylene-vinyl chloride polymers, ethylene-vinyl chloride-vinyl acetate polymers, polyvinyl chloride polymers, nitrile polymers, and any other suitable latex polymer known in the art. Commercially available acrylic binders that may be employed include, for instance, Rhoplex™ AC-261, Rhoplex™ EC-1791, Rhoplex™ 2019R, Rhoplex™ B-60-A, and Rhoplex™ EC-2885, which are available from Rohm and Haas Co.

In addition to binders, the powder composition may also include other components that facilitate the ability of the particles to form the capacitor anode. For example, one or more dispersants may be employed in the powder composition to reduce the surface tension of the suspension. One class of suitable dispersants includes anionic polymers having acid groups or salts thereof. Such polymers, for example, typically contain at least one ethylenically unsaturated acid containing monomer and optionally at least one ethylenically unsaturated nonionic monomer. Suitable acid monomers include monomers having carboxylic acid groups, such as acrylic acid, methacrylic acid, itaconic acid, fumaric acid, crotonic acid, maleic acid, monomethyl itaconate, monomethyl fumarate, and monobutyl fumarate; anhydrides, such as maleic anhydride and itaconic anhydride; or combinations thereof. Suitable ethylenically unsaturated monomers include alkyl esters of (meth)acrylic acid, such as ethyl acrylate, butyl acrylate, and methyl methacrylate; hydroxy esters of (meth)acrylic acid, such as hydroxyethyl methacrylate, hydroxyethyl acrylate, hydroxypropyl acrylate, and hydroxypropyl methacrylate; aromatic monomers, such as styrene and α-methyl styrene; and alkenes, such as di-isobutylene. Commercially available examples of suitable anionic polymer dispersants include, for instance, Tamol™ 731A (sodium salt of poly(maleic anhydride)) and Tamol™ 850 (sodium salt of poly(methyl methacrylate)), both of which are available from Rohm & Haas Co.

A wetting agent, or surfactant, may also be employed in the powder composition to facilitate the formation of homogeneously uniform powder compositions having desirable spreadability. Suitable surfactants may include cationic surfactants, nonionic surfactants, anionic surfactants, amphoteric surfactants, and so forth. Nonionic surfactants, for instance, may have a hydrophobic base, such as a long chain alkyl group or an alkylated aryl group, and a hydrophilic chain comprising a certain number (e.g., 1 to about 30) of ethoxy and/or propoxy moieties. Examples of some classes of nonionic surfactants that can be used include, but are not limited to, ethoxylated alkylphenols, ethoxylated and propoxylated fatty alcohols, polyethylene glycol ethers of methyl glucose, polyethylene glycol ethers of sorbitol, ethylene oxide-propylene oxide block copolymers, ethoxylated esters of fatty ($C_8$-$C_{18}$) acids, condensation products of ethylene oxide with long chain amines or amides, condensation products of ethylene oxide with alcohols, and mixtures thereof. Particularly suitable nonionic surfactants may include the polyethylene oxide condensates of one mole of alkyl phenol containing from about 8 to 18 carbon atoms in a straight- or branched-chain alkyl group with about 5 to 30 moles of ethylene oxide. Specific examples of alkyl phenol ethoxylates include nonyl condensed with about 9.5 moles of ethylene oxide per mole of nonyl phenol, dinonyl phenol condensed with about 12 moles of ethylene oxide per mole of phenol, dinonyl phenol condensed with about 15 moles of ethylene oxide per mole of phenol and diisoctylphenol condensed with about 15 moles of ethylene oxide per mole of phenol. Such compounds are commercially available under the trade name Triton™ CF-100 from Dow Chemical Co. of Midland, Mich.

Plasticizers may also be employed in the powder composition to enhance the film-forming characteristics of the powder composition, and to impart flexibility into the green tape at lower temperatures. Plasticizers are well-known and a wide range of plasticizers can be employed. Examples of typical plasticizers include mineral oil; glycols, such as propylene glycol; phthalic esters, such as dioctyl phthalate and benzyl butyl phthalate; and long-chain aliphatic acids, such as oleic acid and stearic acid; and mixtures thereof.

The concentration of each component of the powder composition may vary depending on the amount of heat desired, the wet pick-up of the application method utilized, etc. For example, the amount of the particles within the powder composition generally ranges from about 20 wt. % to about 90 wt. %, in some embodiments from about 40 wt. % to about 85 wt. %, and in some embodiments, from about 60 wt. % to about 80 wt. %. Binder(s) may also constitute from about 0.01 wt. % to about 20 wt. %, in some embodiments from about 0.1 wt. % to about 15 wt. %, and in some embodiments, from about 1 wt. % to about 10 wt. % of the powder composition. Other components, such as dispersants, surfactants, plasticizers, etc., may each constitute from about 0.001 wt. % to about 10 wt. %, in some embodiments from about 0.01 wt. % to about 5 wt. %, and in some embodiments from about 0.1 wt. % to about 3 wt. % of the powder composition.

A variety of conventional fabricating procedures may generally be utilized to form the anode. Exemplary pressed powder anodes are described, for instance, in U.S. Pat. No. 7,099,143 to Fife, et al., which is incorporated herein in its entirety by reference thereto for all purposes. Alternatively, the anode may be formed from ceramic particles (e.g., $Nb_2O_5$, $Ta_2O_5$) that are chemically reduced to form an electrically conductive material (e.g., NbO, Ta). For instance, a powder composition containing the ceramic particles may be initially formed and deposited onto a substrate in the form of a thin sheet using known methods such as, printing, tape drawing, tape-casting (also known as doctor blade or knife-coating), molding, extrusion, drain casting, etc. If desired, multiple layers may be formed to achieve the target thickness for the anode. Once formed, the layer(s) may be subjected to a heat treatment to chemically reduce the ceramic particles and form the electrically conductive anode. Such slip-formed anodes may exhibit a small thickness, high aspect ratio (i.e., ratio of width to thickness), and uniform density, which may in turn lead to an improved volumetric efficiency and equivalent series resistance ("ESR"). Exemplary slip-formed anodes, such as described above, are described in a co-pending application filed on the same date as the present application and entitled "Anode for Use in Electrolytic Capacitors", which is incorporated herein in its entirety by reference thereto for all purposes.

In one particular embodiment, the powder composition is tape cast onto a carrier substrate. The carrier substrate may be formed from a variety of different materials, such as polyolefins (e.g., polypropylene, polyethylene, etc.), polyesters (e.g., polyethylene terephthalate, polybutylene terephthalate, etc.), polycarbonates, polyacrylates (e.g., polymethylmethacrylate), polystyrenes, polysulfones, polyethersulfone, cellulose acetate butyrate, glass, metals, combinations thereof; and so forth. In one particular embodiment, the carrier substrate is formed from polyethylene terephthalate (PET). The carrier substrate may be in the form of a film, sheet, panel or pane of material, and may be formed by any well-known process, such as blowing, casting, extrusion, injection molding, and so forth. The coated carrier substrate may then be passed under a blade assembly (e.g., knife, doctor blade, etc.), with the gap under the blade assembly controlling the thickness of the coating. After being spread on the carrier substrate, the powder composition is dried to remove its volatile constituents. The resulting dried layer may be stripped from the carrier substrate, thereby yielding a free-standing green tape. Exemplary casting techniques are described, for instance, in U.S. Pat. Nos. 2,582,993 to Howatt; 2,966,719 to Park, Jr.; 4,786,342 to Zellner, et al.; 5,002,710 to Shanefield, et al.; and 6,776,861 to Wang, et al., which are incorporated herein in their entirety by reference thereto for all purposes.

Referring to FIG. 1, for instance, one embodiment of a tape casting process that may be employed is shown. As depicted, a liquid powder composition 14 is initially poured, pumped, or otherwise provided to a liquid reservoir 10. From the reservoir, the liquid powder composition 14 may then be disposed onto a moving carrier substrate film 13, which is unwound from a supply roll 12 and taken up by a roll 32. The powder composition 14 thus wets the carrier substrate film 13 and is carried therewith through a gap 22 formed between a doctor blade 15 and the film 13 to form a ceramic layer 24. The size of the gap 22 influences the thickness of the resulting ceramic layer, and may be adjusted by varying the height and/or position of the doctor blade 15. Typically, the thickness is within the range of about 1 to about 150 micrometers, in some embodiments from about 5 to about 100 micrometers, and in some embodiments, from about 20 to about 80 micrometers. Once formed, the ceramic layer 24 may then be conveyed to a drying area where the solvent is evaporated from the powder composition to form a dry "green" tape layer. Drying may be accomplished under ambient conditions (e.g., in air at ambient temperatures) or through any known drying technique known in the art (e.g., oven). Once dry, the "green" tape layer is then wound up onto a take-up roll 36 for subsequent processing, such as cutting the tape into a certain shape (e.g., hexagon, square, circle, oval, rectangle, triangle, etc.).

Although a single layer of tape may be employed to form the capacitor anode, multiple layers may also be employed. The layers may be formed, for instance, during the casting process. Alternatively, separate layers of green tape may be formed, stacked, and then laminated together to produce the anode. Regardless of the particular manner in which they are formed, the use of multiple layers provides a variety of benefits, including the ability to help minimize any variations in the powder composition that might occur. The number of individual layers employed may generally vary, but typically ranges from 2 to 50, in some embodiments, from 3 to 30, and in some embodiments, from 4 to 20. The total thickness of the stacked layers is relatively small so that the resulting anode is thin. For example, the total thickness of the layers is typically about 2000 micrometers or less, in some embodiments about 1000 micrometers or less, and in some embodiments, from about 100 to about 800 micrometers.

When stacking multiple tape layers together, it is often desired to position one or more sacrificial members between adjacent tape layers that are later removed during firing. Thus, upon removal of the sacrificial members, spaces corresponding to the size and shape of the respective members may remain in the resulting anode. Such spaces may provide a variety of benefits, including increasing the porosity of the anode, providing a location for insertion of an anode lead, and so forth. The sacrificial members may generally be formed from any material that is capable of being removed in a subsequent firing step. Typically, the material is also selected to possess sufficient strength and integrity during the formation of the anode so that the tape layers do not collapse over the space left by the burnt out member. Exemplary materials for this purpose include, for instance, synthetic polymers, such as polyamides (e.g., nylon 6, nylon 66, nylon 11, or nylon 12), polyesters, polyvinyl chlorides, fluoropolymers (e.g., polyvinylidene fluoride), polyolefins (e.g., polyolefin), etc. Such synthetic polymers may constitute about 50 wt. % or more, in some embodiments about 70 wt. % or more, and in some embodiments, about 90 wt. % or more of the insert material. The form of the sacrificial member may also be selected as desired, such as fibers having any known construction, e.g., monofilament or a multifilament (e.g., braided), inks, etc.

One benefit of the sacrificial member(s) is that the desired shape and size of the space(s) may be easily controlled through the selection of an appropriate sacrificial member(s). When the space is configured to receive an anode lead wire, for instance, the cross-sectional size of the space may be targeted to be slightly larger than the actual size of the wire to accommodate for shrinkage of the tape layers during subsequent firing. For example, the space may be targeted to have a cross-sectional width that is at least about 1%, in some embodiments at least about 2%, and in some embodiments, from about 5% to about 20% greater than the respective size of the wire. Lead wires typically have a cross-sectional width of from about 50 to about 1000 micrometers, in some embodiments from about 100 to about 750 micrometers, and in some embodiments, from about 150 to about 500 micrometers. Thus, the space might have a target cross-sectional width of from about 55 to about 1200 micrometers, in some embodiments from about 110 to about 900 micrometers, and in some embodiments, from about 165 to about 600 micrometers. To achieve such a space, the corresponding cross-sectional width of the sacrificial member may also range from about 55 to about 1200 micrometers, in some embodiments from about 110 to about 900 micrometers, and in some embodiments, from about 165 to about 600 micrometers. The shape of the sacrificial member(s) and corresponding space(s) is also not limited, and may be rectangular, square, circular, oval, triangular, hexagonal, etc.

Whether or not a sacrificial member is employed, the tape layers are normally compacted using any conventional press techniques to form a monolithic anode body. Conventional press molds may be employed, such as single station compaction presses using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The time and pressure imparted during compaction may generally be selected to provide the desired monolithic body without substantially disrupting the integrity of any sacrificial members located therein. Also, if desired, sequential compaction steps may be employed to pre-laminate sacrificial member(s) to the tape layers and thereafter to form a monolithic entity.

After compaction, the resulting monolithic anode body may then be diced into any desired shape, such as square, rectangle, circle, oval, triangle, etc. Polygonal shapes having more than four (4) edges (e.g., hexagon, octagon, heptagon, pentagon, etc.) are particularly desired due to their relatively high surface area. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. Nos. 6,191,936 to Webber, et al.; 5,949,639 to Maeda, et al.; and 3,345,545 to Bourgault et al., as well as U.S. Patent Application Publication No. 2005/0270725 to Hahn, et al., all of which are incorporated herein in their entirety by reference thereto for all purposes.

The diced anode body is then subjected to a heating step in which most, if not all, of the non-ceramic components in the body (e.g., binder, sacrificial members, dispersants, wetting agents, solvents, etc.) are removed. The temperature at which the anode body is heated depends on the type of components employed in the anode body. For example, the anode body is typically heated by an oven that operates at a temperature of from about 500° C. to about 1750° C., in some embodiments from about 600° C. to about 1600° C., and in some embodiments, from about 700° C. to about 1500° C. Such heating may occur for about 10 to about 300 minutes, in some embodiments from about 20 to about 200 minutes, and in some embodiments, from about 30 minutes to about 90 minutes. Heating may occur in air, or under a controlled atmosphere (e.g., under vacuum).

Regardless, the anode body is subjected to a heat treatment to form an electrically conductive anode body by chemically reducing the ceramic particles. For example, a valve metal pentoxide (e.g., $Nb_2O_5$) may be reduced to a valve metal oxide having an atomic ratio of metal to oxygen of 1:less than 2.5, in some embodiments 1:less than 2.0, in some embodiments 1:less than 1.5, and in some embodiments, 1:1. Examples of such valve metal oxides may include niobium oxide (e.g., NbO), tantalum oxide, etc., and are described in more detail in U.S. Pat. No. 6,322,912 to Fife, which is incorporated herein in its entirety by reference thereto for all purposes. To accomplish the desired chemical reduction, a getter material is typically employed that accepts oxygen atoms from the ceramic. The getter material may be any material capable of reducing the specific starting ceramic to an oxygen reduced ceramic. Preferably, the getter material comprises tantalum, niobium, alloys thereof, or combinations thereof. The getter material may possess any shape or size. For instance, the getter material may be in the form of a tray that contains the niobium oxide to be reduced or can be in a particle or powder size.

Heat treatment also typically occurs in an atmosphere that facilitates the transfer of oxygen atoms from the ceramic to the getter material. For example, the heat treatment may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed. Heat treatment may be imparted using any heat treatment device or furnace commonly used in the heat treatment of metals. The temperature, reducing atmosphere, and time of the heat treatment may depend on a variety of factors, such as the type of ceramic, the amount of reduction of the ceramic, the amount of the getter material, and the type of getter material. Typically, heat treatment occurs at a temperature of from about 800° C. to about 1900° C., in some embodiments from about 1000° C. to about 1500° C., and in some embodiments, from about 1100° C. to about 1400° C., for a time of from about 5 minutes to about 100 minutes, and in some embodiments, from about 30 minutes to about 60 minutes.

The metal particles are subsequently sintered so that a bond forms between the particles and the cathode substrate. Although such sintering step(s) may occur simultaneously with sintering of the cathode coating as described below, it is usually desired that the metal particles are sintered separately, prior to the subsequent sintering of the cathode coating. In this manner, the sintering conditions may be more specifically tailored to the particles employed. For example, the metal particles may be sintered at a temperature that is higher than the preferred sintering temperature for the cathode coating, such as at a temperature of from about 1000° C. to about 2500° C., in some embodiments from about 1000° C. to about 2000° C., and in some embodiments from about 1200° C. to about 1800° C. The heating step(s) may occur at a relatively low pressure, such as less than about 200 millitorr, in some embodiments less than about 100 millitorr, and in some embodiments, less than about 50 millitorr. The total time of the heating step(s) may range from about 10 minutes to about 1 hour.

The anode of the present invention may possess any desired shape, such as square, rectangle, circle, oval, triangle, etc. Polygonal shapes having more than four (4) edges (e.g., hexagon, octagon, heptagon, pentagon, etc.) are particularly desired due to their relatively high surface area. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. Nos. 6,191,936 to Webber, et al.; 5,949,639 to Maeda, et al.; and 3,345,545 to Bourqault et al., as well as U.S. Patent Application Publication No. 2005/0270725 to Hahn, et al., all of which are incorporated herein in their entirety by reference thereto for all purposes.

Once formed, the anode is typically anodized so that a dielectric film is formed over and within the anode. Anodization is an electrical chemical process by which the anode metal is oxidized to form a material having a relatively high dielectric constant. For example, a niobium oxide (NbO) anode may be anodized to form niobium pentoxide ($Nb_2O_5$). Specifically, in one embodiment, the niobium oxide anode is dipped into a weak acid solution (e.g., phosphoric acid, polyphosphoric acid, mixtures thereof, and so forth) at an elevated temperature (e.g., about 85° C.) that is supplied with a controlled amount of voltage and current to form a niobium pentoxide coating having a certain thickness. The power supply is initially kept at a constant current until the required formation voltage is reached. Thereafter, the power supply is kept at a constant voltage to ensure that the desired dielectric thickness is formed over the surface of the anode. The anodization voltage typically ranges from about 10 to about 200 volts, and in some embodiments, from about 20 to about 100 volts. In addition to being formed on the surface of the anode, a portion of the dielectric oxide film will also typically form on the surfaces of the pores of the material. It should be understood that the dielectric film may be formed from other types of materials and using different techniques.

II. Cathode

The cathode may be constructed using any of a variety of techniques. In one embodiment, the cathode contains a current collector formed from any metal suitable for use in forming a capacitor, such as tantalum, niobium, aluminum, nickel, hafnium, titanium, copper, silver, steel (e.g., stainless), alloys thereof, and so forth. The configuration of the cathode current collector may generally vary as is well known to those skilled in the art. For example, the current collector may be in the form of a container, can, foil, sheet, foam, mesh, screen, cloth, felt, etc. In one embodiment, the cathode current collector is a mesh material. The surface area of the cathode current collector is selected to provide a certain level of capacitance. For example, the cathode current collector covers a surface area of from about 0.1 to about 25 square centimeters, in some embodiments from about 0.2 to about 15 square centimeters, and in some embodiments, from about 0.5 to about 10 square centimeters. It should be understood that the specific surface area of the current collector may be much greater than the ranges specified above.

In certain embodiments, a cathode coating is formed on the current collector that supports an electrochemical capacitance at an interface with the electrolyte and has a high ratio of surface area to volume. The cathode coating may contain electrochemically-active particles that are conductive so that the electrolyte maintains good electrical contact with the cathode current collector. The extent of conductivity may be characterized in terms of the "resistivity" of the electrochemically-active particles at about 20° C., which is generally less than about 1 ohm-cm, in some embodiments less than about $1 \times 10^{-2}$ ohm-cm, in some embodiments less than about $1 \times 10^{-3}$ ohm-cm, and in some embodiments, less than about $1 \times 10^{-4}$ ohm-cm. The electrochemically-active particles increase the effective cathode surface area over which the electrolyte electrochemically communicates with the cathode current collector. Such an increased effective cathode surface area allows for the formation of capacitors with increased cathode capacitance for a given size and/or capacitors with a reduced size for a given capacitance. Typically, the electrochemically-active particles have a specific surface area of at least about 200 $m^2/g$, in some embodiments at least about 500 $m^2/g$, and in some embodiments, at least about 1500 $m^2/g$. To achieve the desired surface area, the electrochemically-active particles generally have a small size. For example, the median size of the electrochemically-active particles may be less than about 100 micrometers, in some embodiments from about 1 to about 50 micrometers, and in some embodiments, from about 5 to about 20 micrometers. Likewise, the electrochemically-active particles may be porous. Without intending to be limited by theory, it is believed that porous particles provide a passage for the electrolyte to better contact the cathode current collector. For example, the electrochemically-active particles may have pores/channels with a mean diameter of greater than about 5 angstroms, in some embodiments greater than about 20 angstroms, and in some embodiments, greater than about 50 angstroms.

Any of a variety of electrochemically-active particles may be employed. For example, metals may be employed as electrochemically-active particles, such as particles formed from ruthenium, iridium, nickel, rhodium, rhenium, cobalt, tungsten, manganese, tantalum, niobium, molybdenum, lead, titanium, platinum, palladium, and osmium, as well as combinations of these metals. In one particular embodiment, for example, the electrochemically-active particles are palladium particles. Non-insulating oxide particles may also be employed. Suitable oxides may include a metal selected from the group consisting of ruthenium, iridium, nickel, rhodium, rhenium, cobalt, tungsten, manganese, tantalum, niobium, molybdenum, lead, titanium, platinum, palladium, and osmium, as well as combinations of these metals. Particularly suitable metal oxides include ruthenium dioxide ($RuO_2$) and manganese dioxide ($MnO_2$). Carbonaceous particles may also be employed that have the desired level of conductivity, such as activated carbon, carbon black, graphite, etc. Some suitable forms of activated carbon and techniques for formation thereof are described in U.S. Pat. Nos. 5,726,118 to Ivey, et al.; 5,858,911 to Wellen, et al.; as well as U.S. Patent Application Publication No. 2003/0158342 to Shinozaki, et al., all of which are incorporated herein in their entirety by reference thereto for all purposes.

Because it is often difficult to bond the electrochemically-active particles directly to the cathode current collector, a binder may also be employed in the cathode coating to effectively adhere the electrochemically-active particles to the cathode current collector. Any binder that provides the desired level of adhesive strength may be used. For example, suitable binders may include polytetrafluoroethylene, polyvinylidene fluoride, carboxymethylcellulose, fluoroolefin copolymer crosslinked polymer, polyvinyl alcohol, polyacrylic acid, polyimide, petroleum pitch, coal pitch, and phenol resins.

In one particular embodiment, an amorphous polymer binder is employed in the cathode coating to help adhere the electrochemically-active particles to the cathode current collector. Many conventional binders are formed from thermoplastic polymers that are semi-crystalline or crystalline in nature (e.g., polytetrafluoroethylene). During formation of the capacitor, such binders generally melt and thereby "wet" a significant portion of the electrochemically-active particles. To the contrary, it is believed that amorphous polymers having a relatively high "glass transition temperature" ("$T_g$") do not undergo melt flow to the same extent as conventional thermoplastic binders, and thus leave portions of the particles uncovered to act as an electrochemical interface with the electrolyte and current collector, thereby enhancing capacitance. More specifically, the amorphous polymers generally have a glass transition temperature of about 100° C. or more, in some embodiments about 150° C. or more, and in some embodiments, about 250° C. or more. As is well known in the art, glass transition temperature may be determined using differential scanning calorimetry ("DSC") in accordance with ASTM D-3418.

Any of a variety of amorphous polymers may be employed having the desired glass transition temperature. One class of particularly suitable amorphous polymers are thermoplastic polyimides, which normally contain aromatic rings coupled by imide linkages—i.e., linkages in which two carbonyl groups are attached to the same nitrogen atom. Suitable thermoplastic polyimides may include, for instance, poly(amide-imide), such as available from Solvay Polymers under the designation Torlon™; poly(ether-imide), such as available GE Plastics under the designation Ultem™); copolymers thereof; and so forth. Amide-imide polymers, for instance, may be derived form an amide-amic acid polymer precursor. The polyamide-amic acid precursor is then cured thermally, generally at a temperature above about 150° C., to form the polyamide-imide. Polyamide-amic acids may be prepared by the polycondensation reaction of at least one polycarboxylic acid anhydride or derivatives thereof, and at least one primary diamine. More particularly, the acid anhydride is typically trimellitic acid or a derivative thereof, such as a lower alkyl ester of trimellitic acid anhydride or a trimellitic acid halide (e.g., acid chloride of trimellitic anhydride, i.e. trimellitic anhydride chloride (TMAC). The primary diamine is likewise typically an aromatic diamine, such as p-phenylenediamine, m-phenylenediamine, oxybis(aniline), benzidene, 1,5-diaminonaphthalene, oxybis(2-methylaniline) 2,2-bis[4-(p-aminophenoxy)phenyl]propane, bis[4-(p-aminophenoxy)]benzene, bis[4-(3-aminophenoxy)]benzene, 4,4'-methylenedianiline, or a combination thereof. Examples of other useful aromatic primary diamines are described in U.S. Pat. Nos. 5,230,956 to Cole, et al. and 6,479,581 to Ireland, et al., which are incorporated herein in their entirety by reference thereto for all purposes. Particularly suitable aromatic diamines include meta-phenylenediamine and oxybis (aniline).

Although not required, the amorphous polymer binder may be provided in the form of particles to enhance its adhesion characteristics. When employed, such binder particles typically have a size distribution ranging from about 1 to about 250 micrometers, and in some embodiments, from about 5 to about 150 micrometers. For example, the particles may have a $D_{90}$ particle size distribution (90 wt. % of the particles have a diameter below the reported value) of about 150 micrometers or less, in some embodiments from about 100 micrometers or less, and in some embodiments, about 75 micrometers or less.

The relative amount of the electrochemically-active particles and binder in the cathode coating may vary depending on the desired properties of the capacitor. For example, a greater relative amount of electrochemically-active particles will generally result in a capacitor having a greater cathode capacitance. If the amount of the electrochemically-active particles is too great, however, the cathode coating may insufficiently bond to the cathode current collector. Thus, to achieve an appropriate balance between these properties, the cathode coating typically contains electrochemically-active particles and binder in a weight ratio, respectively, of from about 0.5:1 to about 100:1, in some embodiments from about 1:1 to about 50:1, and in some embodiments, from about 2:1 to about 20:1. The electrochemically-active particles may constitute from about 50 wt. % to about 99 wt. %, in some embodiments from about 60 wt. % to about 98 wt. %, and in some embodiments, from about 70 wt. % to about 95 wt. % of the cathode coating. Likewise, the binder may constitute from about 1 wt. % to about 40 wt. %, in some embodiments from about 2 wt. % to about 30 wt. %, and in some embodiments, from about 5 wt. % to about 20 wt. % of the cathode coating.

In addition to containing electrochemically-active particles and a binder, the cathode coating may also contain other components. For instance, a conductive filler may be employed in some embodiments to further enhance the conductivity of the coating. Such conductive fillers may be particularly beneficial in counteracting any loss of conductivity that might result from the binder covering a portion of the surface of the electrochemically-active particles. Any suitable conductive filler may be employed, such as metallic particles (e.g., silver, copper nickel, aluminum, and so forth); non-metallic particles (e.g., carbon black, graphite, and so forth). When employed, the conductive filler may constitute from about 1 wt. % to about 40 wt. %, in some embodiments from about 2 wt. % to about 30 wt. %, and in some embodiments, from about 5 wt. % to about 20 wt. % of the cathode coating.

To apply the coating to the cathode current collector, the electrochemically-active particles, binder, and/or conductive filler may be mixed with a solvent, either separately or together, to form a coating formulation. Any solvent may be employed, such as water; glycols (e.g., propylene glycol, butylene glycol, triethylene glycol, hexylene glycol, polyethylene glycols, ethoxydiglycol, and dipropyleneglycol); glycol ethers (e.g., methyl glycol ether, ethyl glycol ether, and isopropyl glycol ether); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. Although the concentration of the solvent may generally vary, it is nonetheless typically present in an amount from about 25 wt. % to about 95 wt. %, in some embodiments from about 30 wt. % to about 90 wt. %, and in some embodiments, from about 40 wt. % to about 85 wt. % of the coating formulation.

The solids content and/or viscosity of the coating formulation may generally vary as desired to achieve the desired coating thickness. For example, the solids content may range from about 5% to about 60% by weight, more particularly, between about 10% to about 50% by weight, and even more particularly, between about 20% to about 40% by weight. By varying the solids content of the coating formulation, the presence of the particles in the coating may be controlled. For example, to form a cathode coating with a higher level of electrochemically-active particles, the formulation may be provided with a relatively high solids content so that a greater percentage of the particles are incorporated into the coating during the application process. In addition, the viscosity of the coating formulation may also vary depending on the coating method and/or type of solvent employed. For instance, lower viscosities may be employed for some coating techniques (e.g., dip-coating), while higher viscosities may be employed for other coating techniques. Generally, the viscosity is less than about $2 \times 10^6$ centipoise, in some embodiments less than about $2 \times 10^5$ centipoise, in some embodiments less than about $2 \times 10^4$ centipoise, and in some embodiments, less than about $2 \times 10^3$ centipoise, such as measured with a Brookfield DV-1 viscometer with an LV spindle. If desired, thickeners or other viscosity modifiers may be employed in the coating formulation to increase or decrease viscosity.

Once formed, the coating formulation may then be applied to the cathode current collector using any known technique. For example, the cathode coating may be applied using techniques such as sputtering, screen-printing, dipping, electrophoretic coating, electron beam deposition, spraying, roller pressing, brushing, doctor blade casting, centrifugal casting, masking, and vacuum deposition. Other suitable techniques are also described in U.S. Pat. Nos. 5,369,547 to Evans, et al.; 6,594,140 to Evans, et al.; and 6,224,985 to Shah, et al., which are incorporated herein in their entirety by reference thereto for all purposes. For example, the cathode current collector may be dipped into or sprayed with the coating formulation. The coating formulation may cover an entire surface of the current collector. Alternatively, the coating formulation may cover only a portion of the current collector so that space remains for a lead wire to reside against the current collector. By way of example, the coating formulation may cover from about 25% and 100% of a surface of the current collector, and in some embodiments, from about 60% to about 95% of a surface of the current collector. Upon application, the coating formulation may optionally be dried to remove any solvent(s). Drying may occur, for instance, at a temperature of from about 50° C. to about 150° C.

III. Electrolyte

The working electrolyte is the electrically active material that provides the connecting path between the anode and cathode, and is generally in the form of a liquid, such as a solution (e.g., aqueous or non-aqueous), dispersion, gel, etc. For example, the working electrolyte may be an aqueous solution of an acid (e.g., sulfuric acid, phosphoric acid, or nitric acid), base (e.g., potassium hydroxide), or salt (e.g., ammonium salt, such as a nitrate), as well any other suitable working electrolyte known in the art, such as a salt dissolved in an organic solvent (e.g., ammonium salt dissolved in a glycol-based solution). Various other electrolytes are described in U.S. Pat. Nos. 5,369,547 and 6,594,140 to Evans, et al., which are incorporated herein their entirety by reference thereto for all purposes.

In one particular embodiment, the electrolyte is relatively neutral and has a pH of from about 5.0 to about 8.0, in some embodiments from about 5.5 to about 7.5, and in some embodiments, from about 6.0 to about 7.5. Despite possessing a neutral pH level, the electrolyte is nevertheless electrically conductive. For instance, the electrolyte may have an electrical conductivity of about 10 or more milliSiemens per centimeter ("mS/cm"), in some embodiments about 30 mS/cm or more, and in some embodiments, from about 40 mS/cm to about 100 mS/cm, determined at a temperature of 25° C. The value of electric conductivity may obtained by using any known electric conductivity meter (e.g., Oakton Con Series 11) at a temperature of 25° C.

The working electrolyte may include a variety of components that help optimize its conductivity, pH, and stability during storage and use of the capacitor. For instance, a solvent is generally employed that functions as a carrier for the other components of the electrolyte. The solvent may constitute from about 30 wt. % to about 90 wt. %, in some embodiments from about 40 wt. % to about 80 wt. %, and in some embodiments, from about 45 wt. % to about 70 wt. % of the electrolyte. Any of a variety of solvents may be employed, such as water (e.g., deionized water); ethers (e.g., diethyl ether and tetrahydrofuran); alcohols (e.g., methanol, ethanol, n-propanol, iso-propanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. Although not necessarily required, the use of an aqueous solvent (e.g., water) is often desired to help maintain the pH of the electrolyte at a relatively neutral level. In fact, water may constitute about 50 wt. % or more, in some embodiments, about 70 wt. % or more, and in some embodiments, about 90 wt. % to 100 wt. % of the solvent(s) used in the electrolyte.

The electrical conductivity of the working electrolyte may be imparted by one or more ionic compounds, i.e., a compound that contains one or more ions or is capable of forming one or more ions in solution. Suitable ionic compounds may include, for instance, inorganic acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. Anhydrides (e.g., maleic anhydride) and salts of the aforementioned acids may also be employed. The salts may be in the form of metal salts, such as sodium salts, potassium salts, calcium salts, cesium salts, zinc salts, copper salts, iron salts, aluminum salts, zirconium salts, lanthanum salts, yttrium salts, magnesium salts, strontium salts, cerium salts), or salts prepared by reacting the acids with amines (e.g., ammonia, triethylamine, tributyl amine, piperazine, 2-methylpiperazine, polyallylamine).

The concentration of ionic compounds is selected to achieve the desired balance between electrical conductivity and pH. That is, a strong acid (e.g., phosphoric acid) may be employed as an ionic compound, although its concentration is typically limited to maintain the desired neutral pH level. When employed, strong acids normally constitute from about 0.001 wt. % to about 5 wt. %, in some embodiments from about 0.01 wt. % to about 2 wt. %, and in some embodiments, from about 0.1 wt. % to about 1 wt. % of the electrolyte. Weak acids (e.g., acetic acid), on the other hand, may be employed so long as the desired electrical conductivity is achieved. When employed, weak acids normally constitute from about 1 wt. % to about 40 wt. %, in some embodiments from about 2 wt. % to about 30 wt. %, and in some embodiments, from about 5 wt. % to about 25 wt. % of the electrolyte. If desired, blends of weak and strong acids may be employed in the electrolyte. The total concentration of ionic compounds may vary, but is typically from about 1 wt. % to about 50 wt. %, in some embodiments from about 2 wt. % to about 40 wt. %, and in some embodiments, from about 5 wt. % to about 30 wt. % of the electrolyte.

If desired, basic pH modifiers may also be used in the electrolyte in an amount effective to balance the effect of the ionic compounds on pH. Suitable basic pH modifiers may include, but are not limited to, ammonia; mono-, di-, and tri-alkyl amines; mono-, di-, and tri-alkanolamines; alkali metal and alkaline earth metal hydroxides; alkali metal and alkaline earth metal silicates; and mixtures thereof. Specific examples of basic pH modifiers are ammonia; sodium, potassium, and lithium hydroxide; sodium, potassium, and lithium meta silicates; monoethanolamine; triethylamine; isopropanolamine; diethanolamine; and triethanolamine.

To ensure that the electrolyte remains stable during conditions of normal storage and use, it is generally desired that its freezing point is about −20° C. or less, and in some embodiments, about −25° C. or less. If desired, one or more freezing point depressants may be employed, such as glycols (e.g., propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); and so forth. Although the concentration of the freezing point depressant may vary, it is typically present in an amount of from about 5 wt. % to about 50 wt. %, in some embodiments from about 10 wt. % to about 40 wt. %, and in some embodiments, from about 20 wt. % to about 30 wt. % of the electrolyte. It should also be noted that the boiling point of the electrolyte is typically about 85° C. or more, and in some embodiments, about 100° C. or more, so that the electrolyte remains stable at elevated temperatures.

A depolarizer may also be employed in the working electrolyte to help inhibit the evolution of hydrogen gas at the cathode of the electrolytic capacitor, which could otherwise cause the capacitor to bulge and eventually fail. When employed, the depolarizer normally constitutes from about 1 to about 500 parts per million ("ppm"), in some embodiments from about 10 to about 200 ppm, and in some embodiments, from about 20 to about 150 ppm of the electrolyte.

Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroacetophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers are nitrobenzoic acids, anhydrides or salts thereof, substituted with one or more alkyl groups (e.g., methyl, ethyl, propyl, butyl, etc). Specific examples of such alkyl-substituted nitrobenzoic compounds include, for instance, 2-methyl-3-nitrobenzoic acid; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth. Without intending to be limited by theory, it is believed that alkyl-substituted nitrobenzoic compounds may be preferentially electrochemically adsorbed on the active sites of the cathode surface when the cathode potential reaches a low region or the cell voltage is high, and may be subsequently desorbed therefrom into the electrolyte when the cathode potential goes up or the cell voltage is low. In this manner, the compounds are "electrochemically reversible", which may provide improved inhibition of hydrogen gas production.

IV. Other Components

In addition to those identified above, other optional components may also be utilized in the wet electrolytic capacitor. For example, a conductive polymer coating may be employed that overlies the current collector and/or cathode coating. Suitable conductive polymers may include, but are not limited to, polypyrroles; polythiophenes, such as poly(3,4-ethylenedioxythiophene) (PEDT); polyanilines; polyacetylenes; poly-p-phenylenes; and derivatives thereof. The conductive polymer coating may also be formed from multiple conductive polymer layers. For example, the conductive polymer coating may contain one layer formed from PEDT and another layer formed from a polypyrrole.

Although not required, the conductive polymer coating may further increase the effective capacitance of the capacitor. For example, when a conductive monomer polymerizes, it typically assumes an amorphous, non-crystalline form, which appears somewhat like a web when viewed under scanning electron microscopy. This means that the resultant conductive polymer coating has high surface area and therefore acts to somewhat increase the effective surface area of the coated current collector to which it is applied. Various methods may be utilized to apply the conductive polymer coating to the cathode coating. For instance, techniques such as screen-printing, dipping, electrophoretic coating, and spraying, may be used to form the coating. In one embodiment, for example, the monomer(s) used to form the conductive polymer (e.g., PEDT), may initially be mixed with a polymerization catalyst to form a dispersion. For example, one suitable polymerization catalyst is BAYTRON C (Bayer Corp.), which is iron (III) toluene-sulphonate and n-butanol. BAYTRON C is a commercially available catalyst for BAYTRON M, which is 3,4-ethylenedioxythiophene, a PEDT monomer also sold by Bayer Corporation. Once a dispersion is formed, the coated cathode current collector may then be dipped into the dispersion so that conductive polymer forms. Alternatively, the catalyst and monomer(s) may also be applied separately. In one embodiment, the catalyst may be dissolved in a solvent (e.g., butanol) and then applied as a dipping solution. Although various methods have been described above, it should be understood that any other method for applying the coating comprising the conductive polymer coating may also be utilized. For example, other methods for applying such a coating comprising one or more conductive polymers may be described in U.S. Pat. Nos. 5,457,862 to Sakata, et al., 5,473,503 to Sakata, et al., 5,729,428 to Sakata, et al., and 5,812,367 to Kudoh, et al., which are incorporated herein in their entirety by reference thereto for all purposes.

A protective coating may also be optionally positioned between the conductive polymer coating and the cathode coating. It is believed that the protective coating may improve the mechanical stability of the interface between the conductive polymer coating and the cathode coating. The protective coating may be formed from a relatively insulative resinous materials (natural or synthetic). Some resinous materials that may be utilized include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The electrolytic capacitor of the present invention may be used in various applications, including but not limited to medical applications, such as defibrillators; automotive applications; military applications, such as RADAR systems; and so forth. The electrolytic capacitor of the present invention may also be used in consumer electronics including radios, televisions, and so forth.

The present invention may be better understood by reference to the following examples.

EXAMPLE 1

A ceramic body was initially formed from the following composition:

| Material | Wt. % |
|---|---|
| DI water | 19.05 |
| Nonionic surfactant | 0.19 |
| Anionic polymer dispersants | 1.30 |
| Acrylic binders | 9.76 |
| $Nb_2O_5$ powder | 69.70 |

The ingredients were milled in a dedicated M-18 vibratory mill. Once formed, the composition was de-aired in a slip pot by stirring for 24 hours. The slip was cast into a 0.001875-inch (1.875 mil) tape on a polypropylene carrier. The carrier with the wet tape was floated across a water bath maintained at a constant temperature of 50 C for a period of 2 minutes to facilitate drying. At the end of the drying phase, a metal blade separated the cast tape from the carrier and the tape was rolled together with a single sheet of paper to keep the tape from sticking to itself during storage. 6"×6" pieces were cut from the tape. 9 of these pieces of tape were then stacked on top of each other and tacked together in a press at 3000 psi for 10 seconds. A sacrificial member was weaved within a loom and disposed between two 9-layer stacks. The sacrificial member was formed from a WN-101 fishing line made by Shakespeare (0.0083 inch in diameter). Thereafter, the stacked layers and loom were pressed together in a Shinto press for 18 seconds and at a pressure of 209 $kg_f/cm^2$. The pressed pad was cut away from the loom then laminated in a Clifton press by pressing at 1845 psi for 2 seconds and releasing the pressure, pressing for 4 seconds at 1845 psi and releasing the pressure, and & release, and then pressing at 1845 psi for 16 seconds. This laminated pad was diced into 21.2 mm×12.7 mm pieces using a PTC CC-7100 dicer. The thickness of the diced bodies was 0.7 mm. The diced bodies weighed 0.55 g each.

EXAMPLE 2

A wet electrolytic capacitor was formed from the ceramic body of Example 1. Initially, a stainless steel mesh (150×150 mesh, obtained from McMaster) was cut into rectangles of 2.2 cm×1.1 cm. Cathode lead wires (annealed stainless steel 304 wire with a gauge of 150 µm) were cut to a length of 2.5 cm. These rectangles and wires were then rinsed first in 45° C. soap water for 30 minutes in an ultrasonic bath and then rinsed with deionized ("DI") water 4 times. After drying in an 85° C. oven for 30 minutes, the samples were again degreased in acetone at ambient temperature for 20 minutes. The samples were dried in an 85° C. oven to remove all the residual acetone, rinsed with DI water 5 times and then dried in 85° C. oven. The cathode lead wire was welded to the middle of the 1.1 cm edge of the rectangular mesh using a spot welder. The depth was about 1.0 mm. The rectangular meshes were then etched in a solution of 1.0 vol. % $H_2SO_4$ and 0.1 vol. % HCl for 1 minute, degreased with DI water 45 times, and then dried with a blower at ambient temperature. The resulting thickness of the mesh substrate was about 130 µm.

An ink was then prepared by mixing 4.0 grams of Norit DLC Super 30 activated carbon in 12.0 grams N-methylpyrrolidone (NMP) in a beaker with a magnetic stirrer. 0.4 grams of BP2000 carbon black was added as a conducting filler material. 0.5 grams Torlon TF 4000 (Solvay Advanced Polymers Co.) was subsequently added. Continuous mixing lasted more than 12 hours at ambient temperature. The ink was applied to the stainless steel substrate by dip coating. A spatula was used to scrape excess ink on both sides of the substrate to prevent thickening of coating at the bottom. These wet cathodes were pre-dried at 120° C. for 15 minutes and then thermally cured at 260° C. for 30 minutes. The loading was 0.0107 grams and the thickness was 150 μm.

For electrical measurement, a simple capacitor was constructed using one rectangular NbO anode against two cathodes. The anodes were formed by disposing the anode bodies of Example 1 onto a porous $Al_2O_5$ substrate. The bodies were then heated in air to 800° C. for 60 minutes. The de-bindered parts were then placed flat between two (2) tantalum substrates (0.1875 inches thick) and heated in a hydrogen atmosphere to 1200° C. for 120 minutes. Thereafter, a 0.19 mm Ta wire was inserted into the hole left by the nylon line. The wire was bonded to the body by heating the part at 1300° C. for 30 minutes in a vacuum. The anode was then anodized at 25 volts in a general phosphoric bath at 85° C. to form a dense oxide dielectric. These rectangular anodes were 20.0 mm long, 11.0 mm wide, and 0.7 mm thick. A piece of Scotch tape was used to wrap around the assembly after one anode, two cathodes and two separators were stacked together. The separators were formed from KP 60 paper (MH Technologies Co.), which had a thickness of 18 μm, length of 2.3 cm, width of 1.2 cm, and a dielectric strength of 23.6 V/μm.

Two cathode lead wires were welded to the cathode to minimize the contact resistance. The anode-separator-cathode assembly was vacuum impregnated for 30 minutes in an aqueous solution prepared according to the composition in Table 1.

TABLE 1

Composition of Working Electrolyte and Properties

| Components | Quantity | pH | Conductivity (mS/cm) | Boiling point (° C.) | Freezing point (° C.) |
|---|---|---|---|---|---|
| DI $H_2O$ | 214.4 g | 6.24 | 60 | 105 | −30 |
| Ethylene glycol | 103.2 g | | | | |
| Acetic Acid | 62.4 g | | | | |
| $H_3PO_4$ | 2.0 g | | | | |
| $NH_3 \cdot H_2O$ | 79.5 mL | | | | |
| 3-methyl-4-nitrobenzoic acid | 1.0 ppm | | | | |

EG&G 273 Potentiostat/Galvanostat and Solartron 1255 Frequency Response Analyzer (FRA) were used. Communication between the hardware and the electrochemical cell was through Screibner Corrware 2.1 software. Impedance measurement was performed on the wet anode-separator-cathode assembly within a frequency window from 0.1 Hz to 100,000 Hz and the bias was controlled at 2.0 V, 5.0 V and 8.0 V, respectively. The real part of the Nyquist plot gave the equivalent series resistance (ESR) of the capacitor for a given frequency and the imaginary part was used for the calculation of capacitance using the following formula:

$$C = \frac{1}{2 \times \pi \times f \times Z''}$$

$C$: capacitance (F)

$f$: frequency (Hz)

$Z''$: imaginary part of impedance (ohm)

The measured capacitance at 0.1 Hz was used to approximate the capacitance under direct current condition. It was 2.53 mF, 2.37 mF and 2.31 mF for bias of 2.0 V, 5.0 V and 8.0 V, respectively. ESR was evaluated at frequency of 1000 Hz and was not as dependent on bias as capacitance. It remained about 1.0Ω for all the bias.

The cathode was measured separately in a three-electrode system using Cyclic Voltammetry method. The counter electrode was a platinum mesh of 5.0 $cm^2$ and the reference electrode was a saturated calomel electrode (SCE). The cathode potential was scanned between −0.5 V vs. SCE and 0.5 V vs. SCE at a rate of 25 mV/s. The DC capacitance of cathode was calculated by the following formula:

$$C = \frac{\Delta Q}{\Delta U}$$

$C$: cathode capacitance $Q$: electrical charge $U$: cathode potential

The cathode capacitance was estimated to be 558.7 mF, which is more than 200 times the anode capacitance.

EXAMPLE 3

A capacitor was formed as described in Example 2, except that carbon black was not employed in the cathode ink. The resulting cathode loading was 0.0107 grams. The measured capacitance at 0.1 Hz was 2.57 mF, 2.42 mF and 2.37 mF for bias of 2.0 V, 5.0 V and 8.0 V, respectively. ESR at frequency of 1000 Hz was 1.98Ω. The cathode capacitance was estimated to be 550.0 mF.

EXAMPLE 4

A capacitor was formed as described in Example 2, except that 1.0 gram of Torlon TF 4000 was added. The cathode loading was 0.0113 grams. The measured capacitance at 0.1 Hz was 2.54 mF, 2.41 mF and 2.35 mF for bias of 2.0 V, 5.0 V and 8.0 V, respectively. ESR at frequency of 1000 Hz was 1.35Ω. The cathode capacitance was estimated to be 550.0 mF.

EXAMPLE 5

A capacitor was formed as described in Example 2, except that 0.4 grams of acetylene carbon (Chevron) was employed as the conductive filler. The cathode loading was 0.0060 grams. The measured capacitance at 0.1 Hz was 2.60 mF, 2.36 mF and 2.23 mF for bias of 2.0 V, 5.0 V and 8.0 V, respectively.

ESR at frequency of 1000 Hz was 1.15Ω. The cathode capacitance was estimated to be 500.0 mF.

EXAMPLE 6

A capacitor was formed as described in Example 5, except that the stainless steel mesh was SS Monel 304 120×120 mesh. The cathode loading was 0.0074 grams. The measured capacitance at 0.1 Hz was 2.64 mF, 2.46 mF and 2.39 mF for bias of 2.0 V, 5.0 V and 8.0 V, respectively. ESR at frequency of 1000 Hz was 1.24Ω. The cathode capacitance was estimated to be 403.4 mF.

EXAMPLE 7

A capacitor was formed as described in Example 6, except that the stainless steel mesh was SS Monel 316 150×150 mesh. The measured capacitance at 0.1 Hz was 2.69 mF, 2.47 mF and 2.37 mF for bias of 2.0 V, 5.0 V and 8.0 V, respectively. ESR at frequency of 1000 Hz was 1.24Ω. The cathode capacitance was estimated to be 384.9 mF.

EXAMPLE 8

A capacitor was formed as described in Example 5, except that the cathode substrate was nickel foam of 110 PPI (Inco). The cathode loading was 0.013 grams. The measured capacitance at 0.1 Hz was 2.66 mF, 2.37 mF and 2.28 mF for bias of 2.0 V, 5.0 V and 8.0 V, respectively. ESR at frequency of 1000 Hz was 1.13Ω. The cathode capacitance was estimated to be 1250 mF.

EXAMPLE 9

A capacitor was formed as described in Example 7, except that 0.4 grams of BP2000 carbon black was employed as the conductive filler. The cathode loading was 0.074 grams. The measured capacitance at 0.1 Hz was 2.54 mF, 2.38 mF and 2.32 mF for bias of 2.0 V, 5.0 V and 8.0 V, respectively. ESR at frequency of 1000 Hz was 1.16Ω. The cathode capacitance was estimated to be 372.3 mF.

EXAMPLE 10

10 pieces of NbO anodes, 11 pieces of cathodes and 20 pieces of separator paper prepared as described in Example 2 and stacked in the sequence of cathode, separator and anode. Each rectangular anode had a length of 11.0 mm, a width of 11.0 mm, and a thickness of 0.7 mm. To match the size of the anode, the cathodes were also cut to squares of 11.0 mm wide. Separator paper of the same size as in Example 2 was simply folded into a U-shape to wrap up a piece of anode. Anode lead wires and cathode lead wires came out of the stack in opposite direction. The entire stack was wrapped up with a piece of Scotch tape. All the anode tantalum and cathode stainless steel lead wires were trimmed to 6.0 mm long. Anode lead wires were welded to one heavy gauge stainless steel wire with diameter of 0.2 mm and cathode lead wires were welded to another wire. The thickness of the stack was 10.0 mm. The anode-separator-cathode assembly was vacuum impregnated for 30 minutes in an aqueous electrolyte used in Example 2. The measured capacitance at 0.1 Hz was 14.53 mF, 12.84 mF and 12.34 mF for bias of 2.0 V, 5.0 V and 8.0 V, respectively. ESR at frequency of 1000 Hz was 0.22Ω.

EXAMPLE 11

Anodes and cathodes were prepared as described in Example 2 with some modifications in dimensions. Specifically, the anodes and cathode substrates were cut into a square having a width of 1.0 cm. Separator paper of the same size as in Example 2 was folded to a U-shape to wrap up an anode. Two NbO anodes were stacked together with 3 cathodes horizontally, as shown in FIG. 3. Anode tantalum lead wires and cathode stainless steel lead wires were trimmed to 6.0 mm long. The anode tantalum lead wires were welded to a heavy gauge tantalum wire of 0.2 mm diameter and the cathode stainless steel lead wires were welded to a heavy gauge stainless steel wire with laser welder under argon atmosphere protection. Both heavy gauge wires were welded to niobium rods with a spot welder. Nickels lead wires were then welded to these niobium rods. This assembly was then wrapped with scotch tape to increase compression and vacuum impregnated in the working electrolyte (set forth in Table 2 below) 30 minutes before it was inserted in the case.

The cases and rubber corks were taken from Nichicon VZ 16V-10 mF leaded aluminum electrolytic capacitors, and first cleaned in detergent and then in acetone to remove the residual chemicals. The cylindrical aluminum case had an OD of 18.0 mm and was 30.0 mm tall. The components were then used for the packaging of the wet NbO capacitors. Because the aluminum case was used only as a container but not as anode or cathode, its interior surface was masked with tape to prevent its direct contact with the anode-cathode assembly. An absorbent cotton ball was put at the bottom of the case and then pre-saturated with working electrolyte of 2.5 grams. After the electrode assembly was inserted in the case, the case was immediately crimped with a lathe. Life test required 2000-hour application of rated 16 volts at 85° C.

Two working electrolytes were prepared for testing as set forth below in Table 2.

TABLE 2

Working Electrolytes for Life Test Wet NbO parts

| Composition | A | B |
|---|---|---|
| $H_2O$ | 214.4 g | 214.4 g |
| Ethylene glycol | 103.2 g | 103.2 g |
| Acetic Acid | 62.4 g | 62.4 g |
| $H_3PO_4$ | 1.0 g | 1.0 g |
| $H_3BO_3$ | 1.0 g | 1.0 g |
| $NH_3 \cdot H_2O$ | 79.5 mL | 79.5 mL |
| 3-methyl-4-nitrobenzoic acid | 1.0 ppm | 30.0 ppm |

Thermal cycling between −30° C. and 105° C. didn't show any signs of precipitation on either electrolyte. The results of the life test are set forth below in Table 3.

TABLE 3

Results of Life Test

| | | Initial | After 2000 hours at 16 volts and 85° C. |
|---|---|---|---|
| A | Capacitance (mF) Bias of 2.0 V | 2.91 | Burst and deformation in |
| | Bias of 5.0 V | 2.54 | the samples due to gas |
| | Bias of 8.0 V | 2.44 | evolution within 72 hours |
| | ESR @ 1.0 kHz (ohm) | 1.32 | |
| | Leakage current (uA) | 10.0 | |
| B | Capacitance (mF) Bias of 2.0 V | 3.00 | 3.12 |
| | Bias of 5.0 V | 2.68 | 2.19 |
| | Bias of 8.0 V | 2.59 | 2.09 |
| | ESR @ 1.0 kHz (ohm) | 0.97 | 1.86 |
| | Leakage current (uA) | 15.9 | 1.9 |

As is apparent from Table 3, the difference in the concentration of gas evolution inhibitor, 3-methyl-4-nitrobenzoic acid, did not show significant influence on the initial performance of these capacitors. However, the capacitor that used electrolyte B showed very stable electrical characteristics under application of rated 16 volts, even after 2000 hours at 85° C. and was not damaged by gas evolution. The capacitor that used electrolyte A, which contained low concentration of gas evolution inhibitor, was broken as a result of expansion of the case caused by gas generation at an initial stage of the life test. Hence, the concentration of gas evolution inhibitor may be maintained at a relatively high level to ensure a prolonged service life.

EXAMPLE 12

Anodes and cathodes were prepared as described in Example 2. The anodes were sliced to rectangles of 5.16 mm×3.88 mm×0.58 mm. Two different forming electrolytes were used in formation of these anodes. The electrolytes were 1.0 wt. % $H_3PO_4$ (phosphoric acid) and 0.5 wt % $H_3PO_4$ mixed with 0.5 wt. % $H_5PO_4$ (polyphosphoric acid). These anodes were first anodized under 24 volts at 85° C. for 120 minutes. Some anodes were later vacuum annealed and/or went through a second formation as shown in Table 1. The capacitance was determined by measuring the DC cell capacitance of these anodes against large Ta slug cathode in electrolyte B as described in Example 11 using Galvanostatic Charge/Discharge method. Leakage current was measured according in 1.0 wt. % $H_3PO_4$. DC capacitance at bias of 2.0 volts and leakage current measured 2 hours after rated voltage of 16 volts was applied were used in the calculation of normalized leakage current at 85° C. The results are set forth below in Table 4.

TABLE 4

Conditions and Results of Anodization and/or Vacuum Annealing

| Sample Groups | $1^{st}$ Formation | Vacuum Annealing | $2^{nd}$ Formation | Normalized leakage current at 85° C. (nA/µF/V) |
| --- | --- | --- | --- | --- |
| 1 | A | — | — | 2.371 |
| 2 | A | 50 mtorrs | — | 0.264 |
| 3 | A | 10 torrs | — | 1.074 |
| 4 | A | 10 torrs | A | 0.776 |
| 5 | B | — | — | 1.071 |
| 6 | B | 50 mtorrs | — | 0.402 |
| 7 | B | 10 torrs | — | 1.062 |
| Forming electrolyte | A | 1.0 wt. % $H_3PO_4$ | | |
| | B | 0.5 wt. % $H_3PO_4$ + 0.5 wt. % $H_5PO_4$ | | |

As indicated, the anodes formed in phosphoric bath exhibited a higher leakage current than those formed in a mixture of phosphoric and polyphosphoric acid.

EXAMPLE 13

Bodies were formed using the method of Example 1, except a single stack of 16 layers was made without any sacrificial members. The laminated pad was diced into 5.50 mm×3.85 mm bodies. The thickness of these bodies was 0.6 mm. To facilitate the attachment of a lead wire, a 0.005" slot was cut with a Kulicke & Soffa dicing saw perpendicular to the plane of the tape to a depth of 2 mm. After cutting, the bodies were reduced to NbO using the process described in Example 2. A 0.19 mm diameter tantalum wire was cut to 9 mm in length. One end of the wire was coined to a thickness that fit snugly into the slot that was cut by the saw. A Trumpf Profiweld laser was used to weld the wire in 2 spots on each side of the anode body. The laser spot size was 0.30 mm. These anodes were anodized to 15V in a phosphoric acid bath adjusted to a conductivity of 8600 µS at a temperature of 85 C using a constant current of 0.05 A per anode until 15V was reached. The anode was then held for 90 minutes at 15V. Capacitance of the anodized part was measured in 18% sulfuric with a large porous tantalum body used for a cathode. The instrument used to make the capacitance measurement was a Hewlett Packard 4263A LCR meter. Capacitance was measured at 120 Hz using a 10V external bias. The average capacitance of 4 parts was 160.3 µF.

EXAMPLE 14

Bodies were formed using the method of Example 1, except two stacks of 8 layers were used. Parts were diced from the pad. The following green dimensions were measured using an average of 130 parts:

| | |
| --- | --- |
| Length: | 5.51 mm (std 0.041) |
| Width: | 3.85 mm (std 0.104) |
| Thickness: | 0.598 mm (std 0.0128) |
| Weight: | 0.0357 g (std 0.0012) |
| Density (calculated from averages): | 2.815 g/cc (std 0.077) |

Following reduction to NbO via the process described in Example 2, the following dimensions were measured using an average of 390 parts:

| | |
| --- | --- |
| Length: | 5.18 mm (std 0.054) |
| Width: | 3.62 mm (std 0.082) |
| Thickness: | 0.550 mm (std 0.0100) |
| Weight: | 0.0268 g (std 0.0007) |
| Density (calculated from averages): | 2.603 g/cc (std 0.072) |

These anodes were anodized to 35V in a phosphoric acid bath adjusted to a conductivity of 8600 µS at a temperature of 85 C using a constant current of 0.05 A per anode until 35V was reached. The anode was then held for 90 minutes at 35V. Capacitance of the anodized part was measured in 18% sulfuric acid with a large porous tantalum body used for a cathode. The instrument used to make the capacitance measurement was a Hewlett Packard 4263A LCR meter. Capacitance was measured at 120 Hz using a 10V external bias. The average capacitance (390 parts) was 102.3 µF and the average CV/g was 133,000 µFV/g.

EXAMPLE 15

Bodies were formed using the method of Example 14, except that nylon ribbon (dimensions 0.6858 mm×0.0762 mm) was used to make sacrificial slots.

EXAMPLE 16

Bodies were formed using the method of Example 15, except that prior to tacking and lamination, holes were punched into each tape using a sharp needle. This was done to create porosity in the final product.

EXAMPLE 17

Bodies were formed using the method of Example 16, except that organic ink lines were printed on the face of each tape prior to tacking and lamination. The ink was made from the following composition:

| Material | Amount (grams) |
| --- | --- |
| Reusche Oil, type G-2622 | 8.266 |
| Nb$_2$O$_5$ powder | 2.135 |
| Carbon Black, Columbian Raven 22 | 2.923 |

The ink was formed as follows. Initially, the Reusche Oil was put into a Univex MF20 planetary mixer. The mixer was set to position 1. The Nb$_2$O$_5$ powder was added slowly to the oil in the mixer. Once all of the Nb$_2$O$_5$ was added, the mixture was mixed for an additional 5 minutes. Carbon Black was then added slowly to the mix, still on position 1. Once all of the carbon was added, the mixer was adjusted to position 2. The mixture was then mixed for an additional 10 minutes. After mixing, the material was processed 2 times through a Kent floor model 3-roll mill with hardened 4"×8" steel rollers and a mill gap set at 0.0005". After milling, the mixture was placed in a Thompson DSRA-12 mixer and blended for 30 minutes. After mixing in the Thompson mixer, the material was returned to the 3-roll mill for one final pass and collected in polypropylene jars.

A 325-mesh stainless steel screen was glued to a metal stacking frame. The screen was masked to expose the electrode pattern desired along with fiduciary alignment markings. Carbon ink was put onto the masked screen and the stacking frame was positioned 0.25" above one of the pieces of tape. A squeegee was then used to print the pattern onto the tape. This was repeated on another piece of tape. The second piece was stacked onto the prior tape aligned so that the electrode pattern was 180° from the prior tape. The procedure was repeated to create a stack having an alternating pattern of slots in the final anode.

EXAMPLE 18

A powder composition was initially formed as follows:

| Material | Wt. % |
| --- | --- |
| DI water | 16.54 |
| Nonionic surfactant | 0.23 |
| Anionic polymer dispersants | 0.35 |
| Acrylic binders | 8.01 |
| Nb$_2$O$_5$ powder | 71.07 |

This mixture was milled together and cast into tape according to the process in Example 1. This tape was then cut into 6"×6" pieces. The organic ink of Example 17 was also printed on the face of each tape prior to tacking and lamination.

A 325-mesh stainless steel screen was glued to a metal stacking frame. The screen was masked to expose the electrode pattern desired along with fiduciary alignment markings. Carbon ink was put onto the masked screen and the stacking frame was positioned 0.25" above one of the pieces of 6"×6" tape. A squeegee was then used to print the pattern onto the tape. This was repeated on another piece of tape. The second piece was stacked onto the prior tape aligned so that the electrode pattern was 180° from the prior tape. The procedure was repeated to create a stack of 22 layers of electrode printed tape. Four unprinted layers were stacked on each end of this stack making a total stack height of 30 layers.

The anode bodies were diced according to the method of Example 1 to the dimensions 3.5 mm×1.8 mm. The parts were 1.25 mm thick. The anode bodies were put into a furnace for 2 hours at 1000° C. in air to remove the organic binders and sacrificial carbon ink. To reduce the Nb$_2$O$_5$ to NbO, the bodies were heated in hydrogen to 1400° C. at 50° C. per minute and held at 1400° C. for a period of 30 minutes between two ½" thick tantalum getter blocks. The resulting body had alternating uniform layers of porosity.

To create a lead wire for anodization, the bodies were attached individually to a rectangular piece of 0.005" thick niobium foil using a Trumpf Profiweld laser with a spot size of 0.5 mm. These anodes were anodized to 35V in a phosphoric acid bath adjusted to a conductivity of 8600 μS at a temperature of 85° C. using a constant current of 0.1 A per anode until 35V was reached. The anode was then held for 90 minutes at 35V. Capacitance of the anodized part was measured in 18% sulfuric acid with a large porous tantalum body used for a cathode. The instrument used to make the capacitance measurement was a Hewlett Packard 4263A LCR meter. Capacitance was measured at 120 Hz using a 2V external bias. The average capacitance (8 parts) was 26.4 μF.

EXAMPLE 19

A multi-layer NbO body was made according to Example 18. Separately, a Haberer anode press was used to press an NbO body from HC Starck NbO onto a 0.19 mm tantalum wire. This body was then sintered at 1500° C. to create a dense structure on the wire. The NbO portion of this wire was then welded to the multi-layer body created above using a Trumpf Profiweld laser with a 0.5 mm spot. These anodes were anodized to 32V in a phosphoric acid bath adjusted to a conductivity of 8600 μS at a temperature of 85° C. using a constant current of 0.1 A per anode until 32V was reached. The anode was then held for 90 minutes at 32V. Capacitance of the anodized part was measured in 18% sulfuric acid with a large porous tantalum body used for a cathode. The instrument used to make the capacitance measurement was a Hewlett Packard 4263A LCR meter. Capacitance was measured at 120 Hz using a 10V external bias. The average capacitance (8 parts) was 28.0 μF.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A wet electrolytic capacitor comprising:
   a plurality of anodes having a thickness of about 1500 micrometers or less, wherein the anodes are porous sintered slugs containing tantalum or niobium oxide;
   a cathode;
   a working electrolyte disposed in electrical contact with the cathode and the anodes;
   an anode termination that is electrically connected to the anodes; and
   a cathode termination that is electrically connected to the cathode.

2. The wet electrolytic capacitor of claim 1, wherein the capacitor contains from 2 to 40 anodes.

3. The wet electrolytic capacitor of claim 1, wherein the capacitor contains from 3 to 30 anodes.

4. The wet electrolytic capacitor of claim 1, wherein the anodes have a thickness of about 50 to about 500 micrometers.

5. The wet electrolytic capacitor of claim 1, wherein the anodes are formed by chemically reducing a the powder.

6. The wet electrolytic capacitor of claim 5, wherein the powder includes niobium pentoxide.

7. The wet electrolytic capacitor of claim 1, wherein an anode lead extends from the anodes, the anode lead being connected to the anode termination.

8. The wet electrolytic capacitor of claim 1, wherein a cathode lead extends from the cathode, the cathode lead being connected to the cathode termination.

9. The wet electrolytic capacitor of claim 1, wherein the anodes contain a dielectric layer.

10. The wet electrolytic capacitor of claim 1, wherein the capacitor contains a plurality of cathodes, wherein at least one of the anodes is positioned between at least two cathodes.

11. The wet electrolytic capacitor of claim 10, wherein the capacitor contains from 3 to 40 anodes.

12. The wet electrolytic capacitor of claim 10, wherein the anodes and cathodes are vertically aligned.

13. The wet electrolytic capacitor of claim 10, wherein the anodes and cathodes are horizontally aligned.

14. The wet electrolytic capacitor of claim 1, further comprising a separator that is positioned between the cathode and at least one of the anodes, the separator permitting flow of the working electrolyte.

15. The wet electrolytic capacitor of claim 1, wherein the cathode, the anodes, and the working electrolyte are enclosed within a container.

16. The wet electrolytic capacitor of claim 15, wherein the container includes a lid through which the anode termination and the cathode termination extend.

17. The wet electrolytic capacitor of claim 1, wherein the cathode contains a current collector and a coating of electrochemically-active particles.

18. The wet electrolytic capacitor of claim 1, wherein the working electrolyte is an aqueous solution.

19. The wet electrolytic capacitor of claim 1, wherein the capacitor exhibits an equivalent series resistance of about 1500 milliohms or less, measured with a 2-volt bias and 1-volt signal at a frequency of 1000 Hz.

20. The wet electrolytic capacitor of claim 1, wherein the capacitor exhibits an equivalent series resistance of about 500 milliohms or less, measured with a 2-volt bias and 1-volt signal at a frequency of 1000 Hz.

* * * * *

UNITED STATES PATENT AND TRADEMARK OFFICE
CERTIFICATE OF CORRECTION

PATENT NO. : 7,649,730 B2 Page 1 of 1
APPLICATION NO. : 11/726029
DATED : January 19, 2010
INVENTOR(S) : Brady Jones, Gang Ning and Bharat Rawal It is certified that error appears in the above-identified patent and that said Letters Patent is hereby corrected as shown below:

On the Title Page, Item (56)
Add to References Cited/U.S. Patent Documents -- 6,407,480 01/2003 Nomoto et al. --

Signed and Sealed this

Ninth Day of March, 2010

David J. Kappos
*Director of the United States Patent and Trademark Office*